United States Patent
Setogawa et al.

(10) Patent No.: US 6,424,793 B1
(45) Date of Patent: Jul. 23, 2002

(54) DATA RECORDING MEDIUM AND DATA REPLAY APPARATUS

(75) Inventors: Toshiaki Setogawa; Ayato Nakagawa, both of Kanagawa; Tsuyoshi Oda, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/198,688

(22) Filed: Nov. 24, 1998

(30) Foreign Application Priority Data

Nov. 28, 1997 (JP) .............................................. 9-329289

(51) Int. Cl.[7] ................................................ H04H 5/91
(52) U.S. Cl. ........................ 386/95; 386/125; 345/810; 369/30.04
(58) Field of Search .................. 386/95, 106, 125–126, 386/46; 369/53.22, 53.31, 30.04; 345/723, 810, 841, 840; H04N 5/91

(56) References Cited

U.S. PATENT DOCUMENTS

| | | | |
|---|---|---|---|
| 5,499,221 A | * 3/1996 | Ito et al. | 386/106 |
| 5,627,657 A | 5/1997 | Park | |
| 5,696,919 A | * 12/1997 | Masuno et al. | 369/30.04 |
| 5,701,385 A | * 12/1997 | Katsuyama et al. | 386/125 |
| 5,929,857 A | * 7/1999 | Dinallo et al. | 345/840 |
| 5,999,228 A | * 12/1999 | Matsuura et al. | 345/734 |
| 6,226,446 B1 | * 5/2001 | Muruse et al. | 386/95 |
| 6,246,401 B1 | * 6/2001 | Setogawa et al. | 345/723 |
| 6,246,402 B1 | * 6/2001 | Setogawa et al. | 345/723 |

FOREIGN PATENT DOCUMENTS

| | | |
|---|---|---|
| EP | 0 737 980 | 10/1996 |
| EP | 0 738 999 | 10/1996 |
| EP | 0 757 350 | 2/1997 |
| EP | 0 788 101 | 8/1997 |

OTHER PUBLICATIONS

Patent Abstracts of Japan, JP 10 283155, Oct. 23, 1998.

* cited by examiner

Primary Examiner—Vincent Boccio
(74) Attorney, Agent, or Firm—Frommer Lawrence & Haug LLP; William S. Frommer; Joe H. Shallenburger

(57) ABSTRACT

A data recording medium and a data replay apparatus are provided for allowing an automatic return to a menu at the completion point of a replay of one content and allowing an arbitrary jump to the next or previous content during a replay of one content. An entire disk of DVD for a musical product such as karaoke is made up of a single program chain (PGC) and tunes are divided into cells. An instruction to jump to a tune selection menu is written in a cell command (cell CMD) of each cell. On completion of a normal replay of a tune, the cell command is executed and the operation jumps to the tune selection menu.

4 Claims, 15 Drawing Sheets

DATA RECORDING MEDIUM AND DATA REPLAY APPARATUS

BACKGROUND OF THE INVENTION

1. Field of the Invention

The present invention relates to a data recording medium such as a digital video disk or digital versatile disk (DVD) that retains data for individually selecting a plurality of contents such as pieces of music to replay and to a data replay apparatus for replaying data on such a recording medium.

2. Description of the Related Art

A DVD and a DVD player have been practically utilized. A DVD is an optical disk for recording digitized video and audio data. Of replaying data on a DVD and recording data onto a DVD, a DVD player performs at least replaying data.

In the DVD format (standard), the format of still picture called subpicture that may be overlaid on a moving picture is defined besides normal moving pictures coded in Moving Picture Experts Group (MPEG) 2. A DVD implements a caption (subtitle) of a movie and a menu with such a subpicture.

In the DVD format, a specific programming language called navigation command is provided for controlling a replay method of a DVD player. Programming in navigation command implements, for example, an interactive program (software) and a replay started at a specific point called chapter such as the start of a highlight scene or a break in a story in a movie or a track on a compact disk (CD) that indicates a break between pieces of music.

An interactive program as mentioned above requires a user-operable picture for interactive questions and answers.

An interactive operation of a DVD player is usually implemented through indirect manipulation by the viewer selecting operation buttons displayed on a menu with cursor keys and so on of a remote controller, instead of direct interactive manipulation using operation buttons of the DVD player or the remote controller. As a result, various types of interactive software may be provided without being restricted by the buttons dedicated to the hardware of the DVD player.

Among menus for such interactive operations, basic ones common to any DVD are defined as DVD system menus. The DVD system menus are frames called up by a viewer through operation of the menu button of the remote controller of the DVD player for replaying a DVD in the DVD player. The format provides that the menu button is required to be added to the remote controller. The DVD system menus include operation buttons displayed on the screen. Various replay patterns are achieved by the viewer through selecting the operation buttons with a cursor key. The format provides that the cursor key is required to be added to the remote controller.

Multiplexed video and audio data as a content of a DVD is called video object (VOB). A VOB is made up of a meaningful series of multiplexed video and audio data and defined as multiplexed data that makes a great sense in allowing access for a continuous replay such as a title of movie, the audio menu or the chapter menu. Each VOB has a serial VOB identification number. The VOB is further divided into units called cells. The cells each have a cell identification number in ascending order. The cells are each defined as a meaningful block as in defining the VOB. For example, the cells correspond to divisions of chapters of a movie title or to pages to be displayed of a menu with a plurality of pages.

According to the DVD format, a unit in which a menu or a title is replayed is represented by replay control data called program chain (PGC). A PGC includes a pre-command (PRE CMD) and a post-command (POST CMD) as navigation commands and VOB identifier (VOB ID). The VOB ID is made up of a combination of the VOB ID number described above and the initial address on the disk where the corresponding VOB is recorded. The VOB ID further includes cell information sections. As the VOB ID, each cell information section is composed of a combination of cell ID number in the VOB and the initial address on the disk where the corresponding cell is recorded, and a cell command (cell CMD) as a navigation command executed at the point of completion of replay of the cell.

A replay of a DVD is thus controlled by such a PGC data structure. In other words, a player is allowed to perform a series of meaningful replay as long as a PGC is included. The DVD format thus defines a single PGC or a plurality of PGCs as 'title'.

According to the authoring guidebook published by the DVD consortium, it is recommended that pieces of music (tunes) are sectioned from one another so that each piece corresponds to a title to replay in the case of a musical product such as a karaoke, in particular, for replaying tunes one by one. Accordingly, a related-art DVD on the market for a musical product is, in general, made up of PGCs whose number corresponds to the number of tunes, one of the PGCs representing one title, that is, one tune. In the post CMD of each PGC, an instruction is written to jump to a menu. Such a structure allows easy authoring since only one type of PGC structure is required regardless of the number of tunes recorded on the DVD.

On the other hand, the data structure described above has the following three problems.

(1) The data structure does not allow fast forward and fast reverse across tunes that are achieved by replay of a conventional laser disk or a video compact disk (CD). The reason is as follows. The DVD format prohibits a direct access across PGCs during a replay by a DVD player, that is, a shift or jump to another PGC while one PGC is being replayed. Therefore the data structure described above does not allow fast forward and fast reverse (or reverse) across tunes. In the data structure, if fast forward is performed, for example, the post CMD is executed at the end of the tune and the status shifts to the menu for tune selection. If fast reverse is performed, a replay of the tune is started at the instant of returning to the start of the tune and the operation of the fast reverse key is disabled.

(2) In a DVD player the data structure does not allow a skip for stopping the replay of the tune being currently replayed and jumping to the start of the next tune or returning to the start of the immediately preceding tune. The reason is as follows. The DVD format defines a skip implemented by a next skip key or a previous skip key as the function of jumping to next or previous part of title (PTT) included in one PGC. The PTT is defined as a single cell or a series of cells. In the data structure described above, however, the PGC being replayed by the DVD player only includes the cell corresponding to the tune being replayed. If the cell is defined as PTT, the DVD player finds no destination since the next or previous tune is PTT included in another PGC. The operation of the next skip key or the previous skip key is thus disabled.

(3) The data structure does not allow random access for jumping to a specific point in a specific tune by inputting time at which a replay is started. The reason is as follows.

The DVD format defines that a display of replay time of a DVD player is made through adding up the replay time of the individual cells in sequence in the PGC. Consequently, the replay time display is reset to zero at the start point of each PGC and no display is provided for indicating the elapsed replay time throughout the disk. Therefore, random access to a specific point in a specific tune by inputting time at which a replay is started is not achieved.

SUMMARY OF THE INVENTION

It is an object of the invention to provide a data recording medium and a data replay apparatus for allowing an automatic return to a menu at the completion point of a replay of one content and allowing an arbitrary jump to the next or previous content during a replay of one content.

A data recording medium of the invention retains data for individually selecting a plurality of contents and replaying each of the contents. The medium includes: a plurality of content data items sectioned so as to each correspond to the respective contents and representing the respective contents; a replay control data item for controlling replay of the content data items; and a menu control data item for displaying a menu for individually selecting the contents and instructing to replay by the replay control data item. The replay control data item has a data structure that allows a shift from a state of replay of a specific one of the contents to a state of replay of another one of the contents, and a data structure that includes an instruction data item executed only during a normal replay for instructing to display the menu by the menu control data item after the replay of the content data item is completed.

A data replay apparatus of the invention is used for a data recording medium including: a plurality of content data items sectioned so as to each correspond to the respective contents and representing the respective contents; a replay control data item for controlling replay of the content data items; and a menu control data item for displaying a menu for individually selecting the contents and instructing to replay by the replay control data item; wherein the replay control data item has a data structure that allows a shift from a state of replay of a specific one of the contents to a state of replay of another one of the contents, and a data structure that includes an instruction data item executed only during a normal replay for instructing to display the menu by the menu control data item after the replay of the content data item is completed. The apparatus replays the content data items and comprises: a menu display means for displaying the menu by using the menu control data item; a replay instruction means for instructing to replay by individually selecting a specific one of the contents by using the menu displayed by the menu display means and for instructing to change the state of replay including a shift from the state of replay of the specific one of the contents to a state of replay of another one of the contents; a content replay means for replaying the content data item by using the menu control data item and the replay control data item, following the instruction given by the replay instruction means; and a menu display instruction means for having the menu display means display the menu based on the instruction data item of the replay control data item after the replay of the content data item by the content replay means is completed.

According to the data recording medium of the invention, the plurality of content data items sectioned so as to each correspond to the respective contents and representing the respective contents are controlled by the replay control data item and replayed. The menu control data item displays the menu for individually selecting the contents and instructing to replay by the replay control data item. The replay control data item allows a shift from a state of replay of a specific one of the contents to a state of replay of another one of the contents. Only during a normal replay the instruction data item instructs to display the menu by the menu control data item after the replay of the content data item is completed.

According to the data replay apparatus of the invention, the menu display means displays the menu by using the menu control data item. The replay instruction means instructs to replay by individually selecting a specific one of the contents by using the menu displayed by the menu display means and instructs to change the state of replay including a shift from the state of replay of the specific one of the contents to a state of replay of another one of the contents. The content replay means replays the content data item by using the menu control data item and the replay control data item, following the instruction given by the replay instruction means. The menu display instruction means has the menu display means display the menu based on the instruction data item of the replay control data item after the replay of the content data item by the content replay means is completed.

Other and further objects, features and advantages of the invention will appear more fully from the following description.

DETAILED DESCRIPTION OF THE PREFERRED EMBODIMENT

A preferred embodiment of the invention will now be described in detail with reference to the accompanying drawings. An example will be described wherein a data recording medium and a data replay apparatus of the embodiment are each applied to a DVD and a DVD player. That is, the DVD corresponds to the data recording medium of the embodiment. The DVD player corresponds to the data replay apparatus of the embodiment. The embodiment is suitable for use in a DVD for a musical product such as karaoke wherein tunes are highly independent of one another and a continuous replay of a plurality of tunes is not preferred. Therefore, the embodiment is applied to such a DVD for a musical product in the following description. A 'piece of music (or tune)' in the embodiment includes not only music but also an accompanying visual image and a telop and so on.

Figure 7:
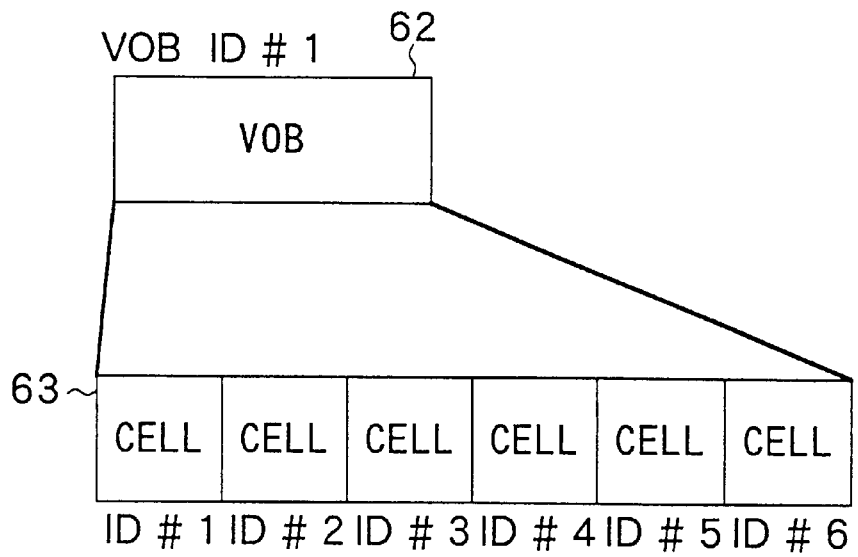
FIG. 7 illustrates the data structure of VOB of a DVD.

Reference is now made to FIG. 7 for describing a data structure of a DVD. Multiplexed video and audio data as a content of a DVD is called video object (VOB). A VOB is made up of a meaningful series of multiplexed video and audio data and defined as multiplexed data making a great sense in allowing access for a continuous replay such as a title of movie, an audio menu or a chapter menu.

Accordingly, a single DVD usually includes a plurality of blocks called VOBs. As shown in FIG. 7, each VOB 62 has a serial VOB identification number (VOB ID number) (ID #1 in FIG. 7). The VOB 62 is further divided into units called cells 63. The cells 63 each have a cell identification number (cell ID number) in ascending order (ID #1 to ID #6 in FIG. 7). The VOB 62 is not mechanically divided into the cells 63 but the cells 63 are each defined as a meaningful block as in defining the VOB. For example, the cells correspond to divisions of chapters of a movie title or to pages to be displayed of a menu with a plurality of pages.

Figure 8:
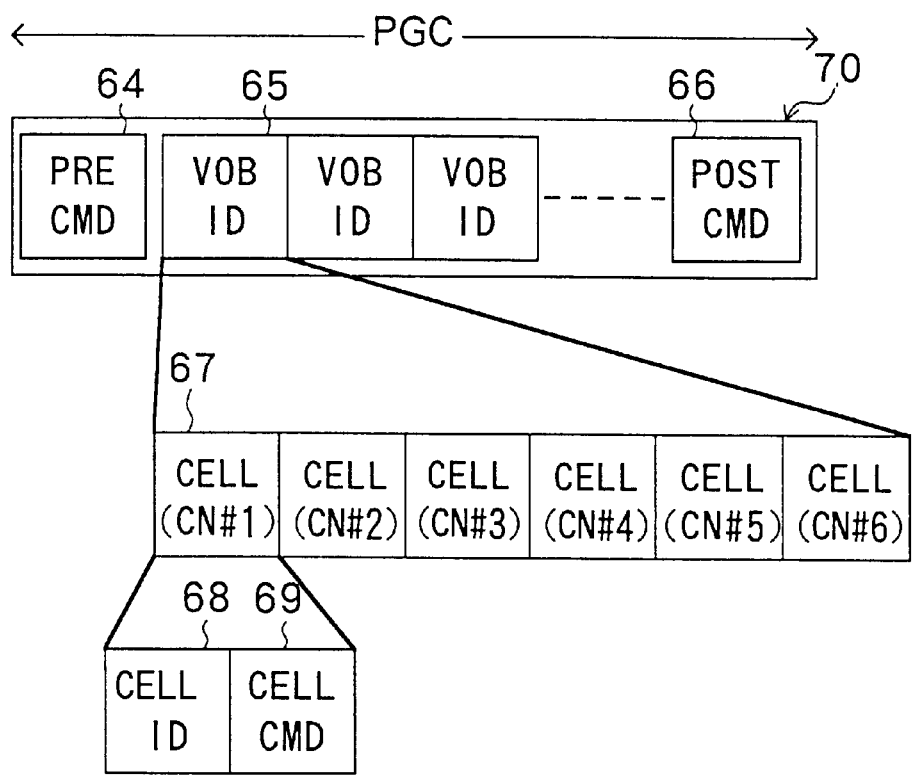
FIG. 8 illustrates the data structure of PGC of the DVD.

According to the DVD format, a unit in which a menu or a title is replayed is represented by replay control data called program chain (PGC). As shown in FIG. 8, a PGC 70 is made up of a pre-command (PRE CMD) 64, a VOB identifier (VOB ID) 65 and a post-command (POST CMD) 66. The VOB ID 65 is made up of a combination of the VOB ID number described above and the initial address on the disk where the corresponding VOB is recorded. A plurality of VOB IDs 65 may be provided in sequence.

The VOB ID 65 includes a series of cell information sections 67 (shown as CELL in FIG. 8). As the VOB ID 65, each cell information section 67 is composed of a cell identifier (cell ID) 68 made up of a combination of cell ID number (of cell numbers CN #1 to CN #6 in FIG. 8) and the initial address on the disk where the corresponding cell is recorded, and a cell command (cell CMD) 69 executed at the point of completion of replay of the cell. The cell CMD 69 is used for specific purposes only as the present invention and may be omitted. The cell CMD 69 is not usually used in an ordinary movie or a still-frame menu.

The DVD player traces the information presented by the VOB ID 65 and the cell ID 68 in the order of appearance so as to determine the address where the content of multiplexed data to replay is recorded and practically performs replay. If there is a cell CMD at the point of completion of replay of each cell, the cell CMD is executed. For convenience, this operation is called a replay of PGC. The PRE CMD 64 is a navigation command executed before the replay of PGC. The POST CMD 66 is a navigation command executed after the replay of PGC. The navigation commands will be described later on.

As thus described, a replay of a DVD is made up of a combination of the PGC 70 with the corresponding actual multiplexed data (VOB 62) and the VOB ID 65 and the cell ID 68 affixed to the VOB 62. The replay is controlled by the navigation commands including the PRE CMD 64, the POST CMD 66 and the cell CMD 69. Although more other items of data are required for the replay of the DVD, description thereof not relating to the present invention is omitted.

As described above, the replay of the DVD is controlled by the PGC data structure. In other words, a player is allowed to perform a series of meaningful replay as long as a PGC is included. The DVD format thus defines a single PGC or a plurality of PGCs as 'title'. Although a PGC makes up a menu of the DVD, too, as described later, the PGC is not a name of a specific matter nor a content included therein but is a name indicating a data structure. Multiplexed audio and video data streams recorded on the DVD are divided into several logical domains for control. There are four types of logical domains. The DVD is made up of a combination of the domains.

First Play Domain (FP DOM)

A domain to access first when the disk is loaded. Only one FP DOM is provided.

Video Manager Menu Domain (VMGM DOM)

A domain wherein a title menu is mainly written. A plurality of VMGM DOMs may be provided. The title menu will be described later.

Video Title Set Menu Domain (VTSM DOM)

A domain wherein a root menu, an audio menu, a subpicture menu, a chapter menu, and an angle menu of the DVD menu are placed except a title menu. A plurality of VTSM DOMs may be provided. The DVD menu will be described later.

Title Domain (TT DOM)

A domain wherein the main title of the DVD is placed. Video data, audio data and subpicture data are multiplexed therein. The TT DOM contains a movie or a video clip itself. A plurality of TT DOMs may be provided.

Each domain described above includes a PGC. According to the domain where a PGC is placed, a PGC in the title domain, for example, is called 'title PGC'. A PGC in the video title set menu domain is called 'menu PGC'. The details of the domains that do not relate to the invention are omitted.

A subpicture required for displaying a menu of the DVD will now be described. In the DVD format, the format of still picture called subpicture that may be overlaid on a moving picture is defined besides normal moving pictures coded in MPEG2. Of the subpicture format of the DVD format, part relating to the embodiment of the invention will be extracted to be briefly described.

Figure 9:
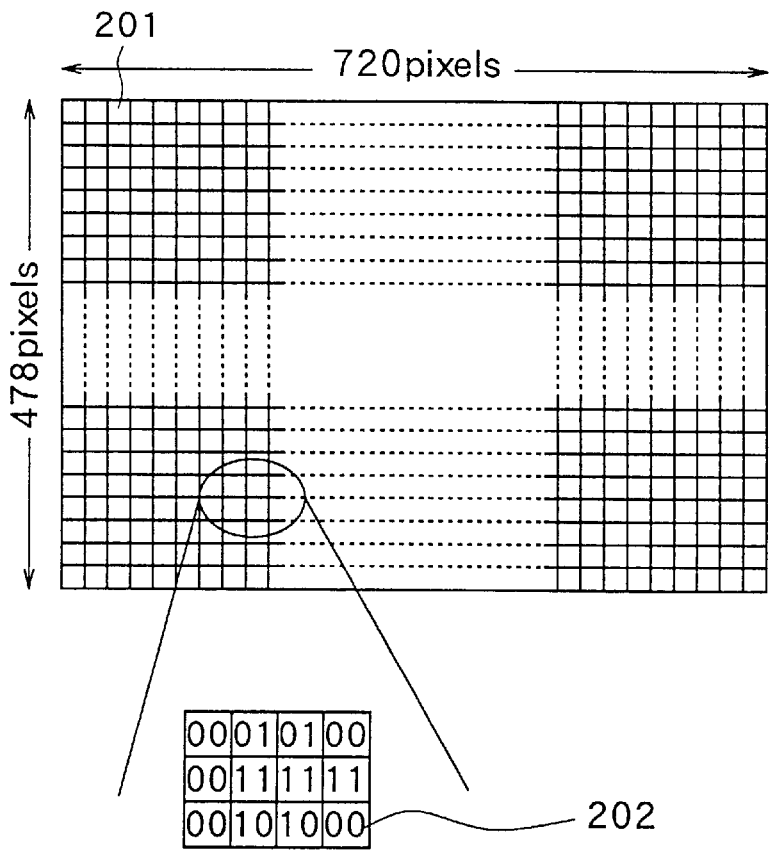
FIG. 9 is an explanatory view for illustrating a subpicture of a DVD.

As shown in FIG. 9, a subpicture of a DVD is defined as an aggregate of specific two-bit pixel data 202 allocated to each of pixels 201 of 720 wide by 478 high (as specified by NTSC video standards) into which a screen is divided. A specific color is assigned to each value represented by two-bit pixel data. The total of four colors are thus represented by pixel data. In practice, a combination of desired four colors is selected from a sixteen color palette to be used as the four colors each assigned to each pixel of the subpicture.

The percentage of subpicture overlaid on a moving picture is selectable. For example, if the percentage of subpicture is 0 percent and that of moving picture is 100 percent, the subpicture is transparent and invisible. If the percentages are both 50 percent, the subpicture is translucent. If the percentages are 100 percent and 0 percent, the background moving picture is completely hidden.

Tables are separately provided for each pixel data for specifying the correspondence of the selected four colors to the values represented by two-bit pixel data and the percentage of the subpicture overlaid over the background moving picture.

Figures 10A, 10B:
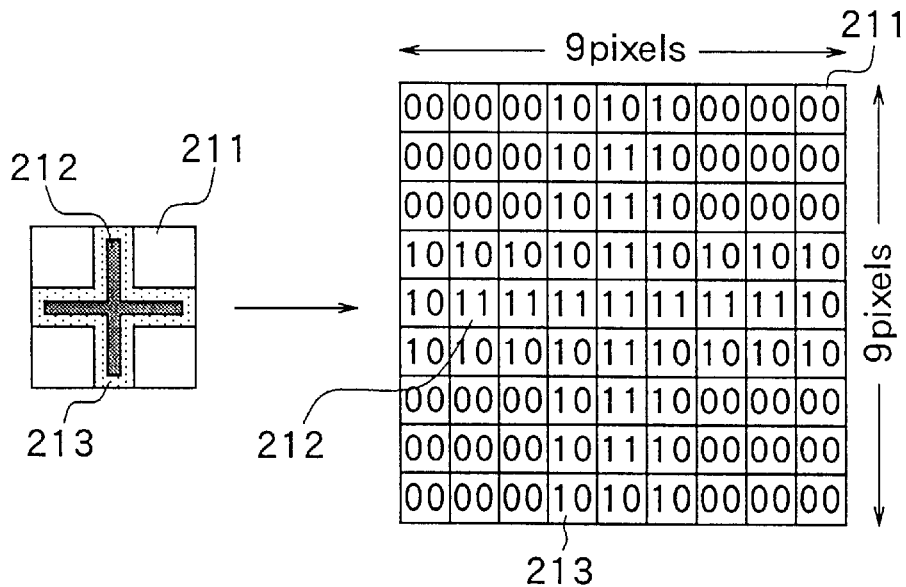
FIG. 10A and FIG. 10B are explanatory views for illustrating a subpicture of a DVD.

Referring to FIGS. 10A and 10B, representation of a 'bordered cross' in a subpicture of a DVD will be considered as an example. As shown in FIG. 10A, the number of colors required for representing the bordered cross is three including the colors of background 211, cross 212 and border 213. Next, the size of the cross is assumed to be 9 by 9 pixels. If pixel data '00' is assigned to the color of the background 211, pixel data '11' to the color of the cross 212 and pixel data '10' to the color of the border 213, an aggregate of 9×9 pixel data is defined as shown in FIG. 10B. The subpicture of one DVD is obtained through performing such an operation for all the pixels of 720 by 478.

With such a subpicture, if pixel data representing characters are arranged only near the lower side of all the region of the 720 by 478 pixels, the section above is all defined as the background 211 and the percentage of pixels of the background 211 to the moving picture is 0 percent, the subpicture wherein the characters are shown near the lower side and the other part is transparent is produced. The DVD implements captions of a movie and so on through the use of such a mechanism.

The navigation commands will now be described. According to the DVD format, as previously described, a specific programming language called navigation command is provided for controlling a replay method of a DVD player. A program written in navigation command is recorded on a DVD together with video and audio data. A DVD player replays the video and audio data in accordance with the program written in navigation command.

A plurality of audio channels may be multiplexed to be recorded on a DVD. For example, a program written in navigation command may be used for designating which of the plurality of channels to be selected and for directly jumping to a chapter for starting a replay. A program written in navigation command may be used for much complicated operations besides these simple examples.

For example, a program written in navigation command achieves an interactive work wherein a still picture (subpicture) for asking the viewer a question appears at the completion of the replay of a chapter and a destination chapter at which replay is started is determined in accordance with the answer of the viewer to the question. This example is a method used in a piece of work called multistory/multiending (a work with game elements wherein a choice between A and B and so on is provided at each break between scenes and the next scene is determined depending on the choice). Through the use of the navigation command, high interactivity is achieved such as repeating a replay of a particular cell or switching a cell to replay in accordance with the selection of the viewer using the DVD menu.

As mentioned above, an interactive work such as a multistory/multiending requires a user-operable picture for interactive questions and answers. Menus of the DVD will now be described. An interactive operation of a DVD player is usually implemented through indirect manipulation by the viewer selecting operation buttons displayed on a menu with cursor keys and so on of a remote controller, instead of direct interactive manipulation using operation buttons of the DVD player or the remote controller.

Menu buttons displayed on a menu of the DVD are made up of still pictures, owing to their natures. Subpictures described above are used for the menu buttons. The menu is made of the subpicture and a background moving picture combined into one image when replayed by the DVD player.

Among menus for interactive operations, the basic ones common to any DVD are defined as the DVD system menus in the DVD format. The DVD system menus are frames called up by the viewer through operation of the menu button of the remote controller of the DVD player for replaying a DVD in the DVD player. The format provides that the menu button is required for the remote controller. Various replay patterns are designated by the viewer through selecting the operation buttons displayed on the screen with a cursor key required for the remote controller. The DVD format defines the following DVD system menus.

1. Title Menu

The title menu is used by the viewer for specifying which title (a piece of movie or animation) of audio and video data will be replayed when a plurality of titles are recorded on the DVD.

2. Chapter Menu

One title (usually called a piece of work such as one motion picture or one album of music video clips) of audio and video data has specific breaks or divisions (the turn of scenes of a movie or the break between video clips to which immediate access is intended by a producer of a record company). Such a break or a division is called chapter. The chapter menu has menu buttons for starting a replay immediately at each chapter.

3. Audio Menu

When a plurality of audio channels are provided for each title of video data recorded on the DVD (when video data of a movie includes audio data in the original language and audio data dubbed in a plurality of other languages, for example), the audio menu is provided for selecting a channel. The audio menu includes menu buttons arranged on the screen, indicating selectable languages and so on each provided for the respective audio channels.

4. Subtitle Menu

The subtitle is a movie and television broadcast term that means a caption. When a single or a plurality of types of subtitles are provided for a title recorded on the DVD, the subtitle menu is provided for selecting which subtitle to display of the plurality of types or for determining whether to display the subtitle or not. The subtitle menu includes menu buttons arranged on the screen, indicating selectable subtitles each provided for the respective subtitles.

5. Angle Menu

The angle is a function specific to the DVD format. For recording a football game, for instance, a plurality of cameras are usually used by which the game is shot simultaneously from different angles. That is, video data of the football game includes images of the entire game taken by a long-shot camera, close-up images taken by a camera following the offense and close-up images taken by a camera following the defense. The angle function of the DVD allows the viewer to select video data shot from a specific angle to replay when a plurality of types of video data obtained through shooting the object simultaneously from different angles are multiplexed to be recorded on the DVD and replayed in the DVD player. The angle menu includes menu buttons arranged on the screen, indicating selectable angles and so on each provided for the respective angles.

6. Root Menu

The total of five types of menus defined in the DVD format are described so far. However, it is not always the case that the remote controller of the DVD player includes five buttons for displaying the five types of menus. The DVD format provides that the two buttons are only required for calling up the title menu and another menu. Therefore, a specific menu is required for calling up the menus if the title to replay requires one or more of the chapter menu, the audio menu, the subtitle menu and the angle menu. The root menu includes one menu button or more arranged on the screen indicating one or more or all of the chapter menu, the audio menu, the subtitle menu and the angle menu.

Figure 11:
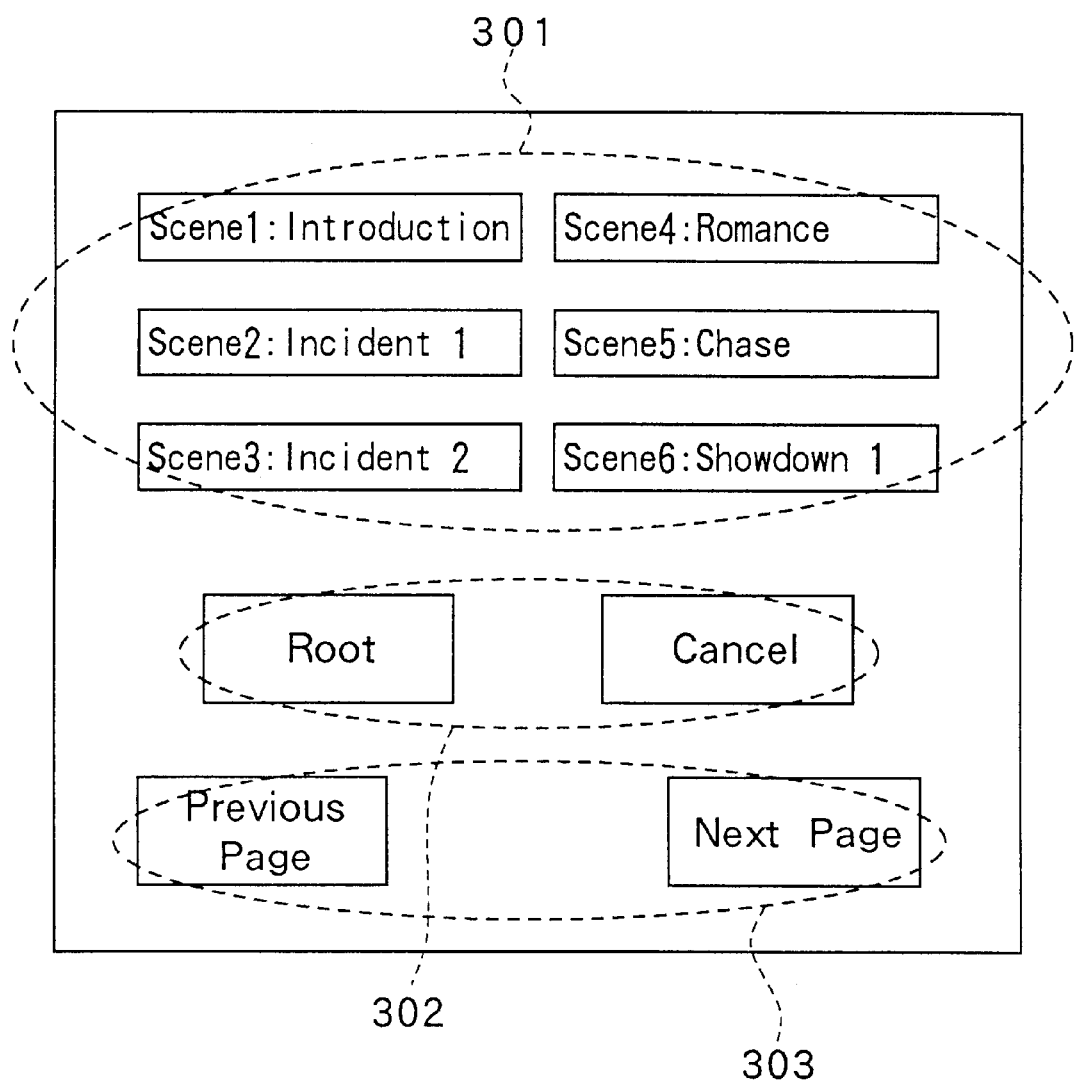
FIG. 11 illustrates an example of a chapter menu of a DVD player.

Various types of DVD system menus are defined in the DVD format. FIG. 11 shows an example of chapter menu which is one of the DVD system menus. The chapter menu is a menu including operation buttons arranged on the screen for allowing a direct jump to each chapter.

The chapter menu in FIG. 11 includes six chapter designation buttons 301, two menu selector buttons 302 and two menu page selector buttons 303. Three of the six chapter designation buttons 301 are vertically arranged on the left of the screen and the other three on the right. The two menu selector buttons 302 are arranged side by side below the chapter designation buttons 301.

For authoring such a menu, it is required to create pixel data corresponding to each operation button in accordance with the subpicture format of the DVD. In addition, it is necessary to perform programming in navigation command required for each operation button.

Figure 12:
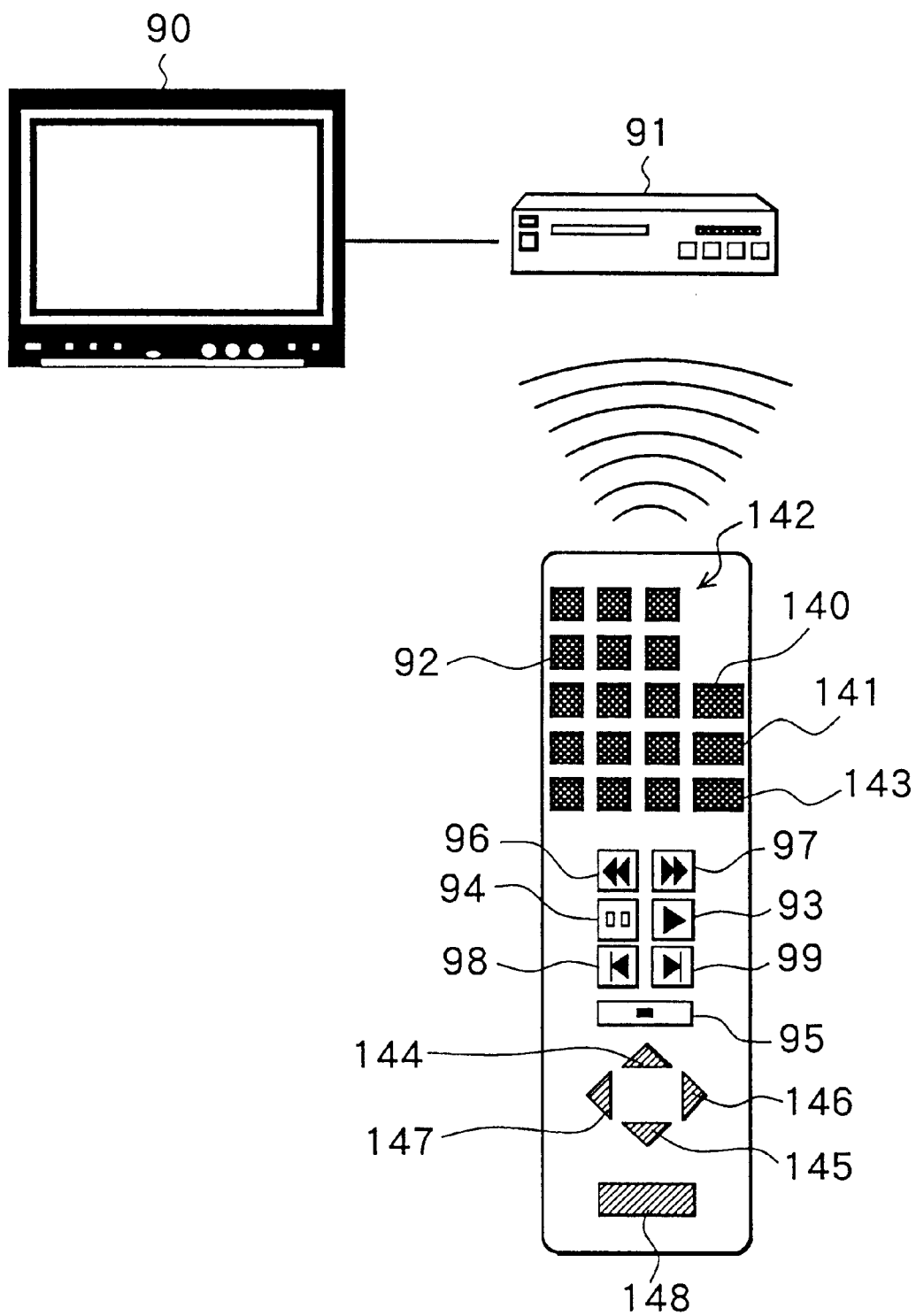
FIG. 12 illustrates a DVD player and its peripherals.

Reference is now made to FIG. 12 for describing operations using the menu as shown in FIG. 11, for example. FIG. 12 illustrates a DVD player and its peripherals. FIG. 12 shows: the DVD player 91; a monitor 90 for displaying pictures replayed by the DVD player 91; and a remote controller 92 for operating the DVD player 91. The remote controller 92 includes: system control keys for performing standard system control, special replay keys, and menu control keys. The system control keys include: a replay key 93 for replaying the DVD; a pause key 94 for stopping a replay for a brief period of time; a stop key 95 for stopping a replay; a fast-reverse key 96; a fast-forward key 97; a previous skip key 98 for skipping to a previous part of title (PTT); and a next skip key 99 for skipping to a next PTT.

The special replay keys include: a chapter designation key 140 for designating a chapter to replay; a time designation key 141 for switching to a time designation mode for designating start time of replay; ten keys 142 for inputting a chapter number to replay, start time of replay and so on; and an enter key 143 for entering the input.

The menu control keys include: an up cursor key 144, a down cursor key 145, a right cursor key 146 and a left cursor key 147 for shifting a selected operation button vertically and horizontally; and a menu enter key 148 for executing the operation of a selected operation button.

In order to replay the DVD by using the menu shown in FIG. 11, for example, with the remote controller 92, the viewer presses the up cursor key 144, the down cursor key 145, the right cursor key 146 and the left cursor key 147 and temporarily selects one of the menu buttons displayed on the monitor 90, shifting the selected button vertically and horizontally. The viewer further presses the menu enter key 148 and executes the operation of the selected menu button.

Figure 13:
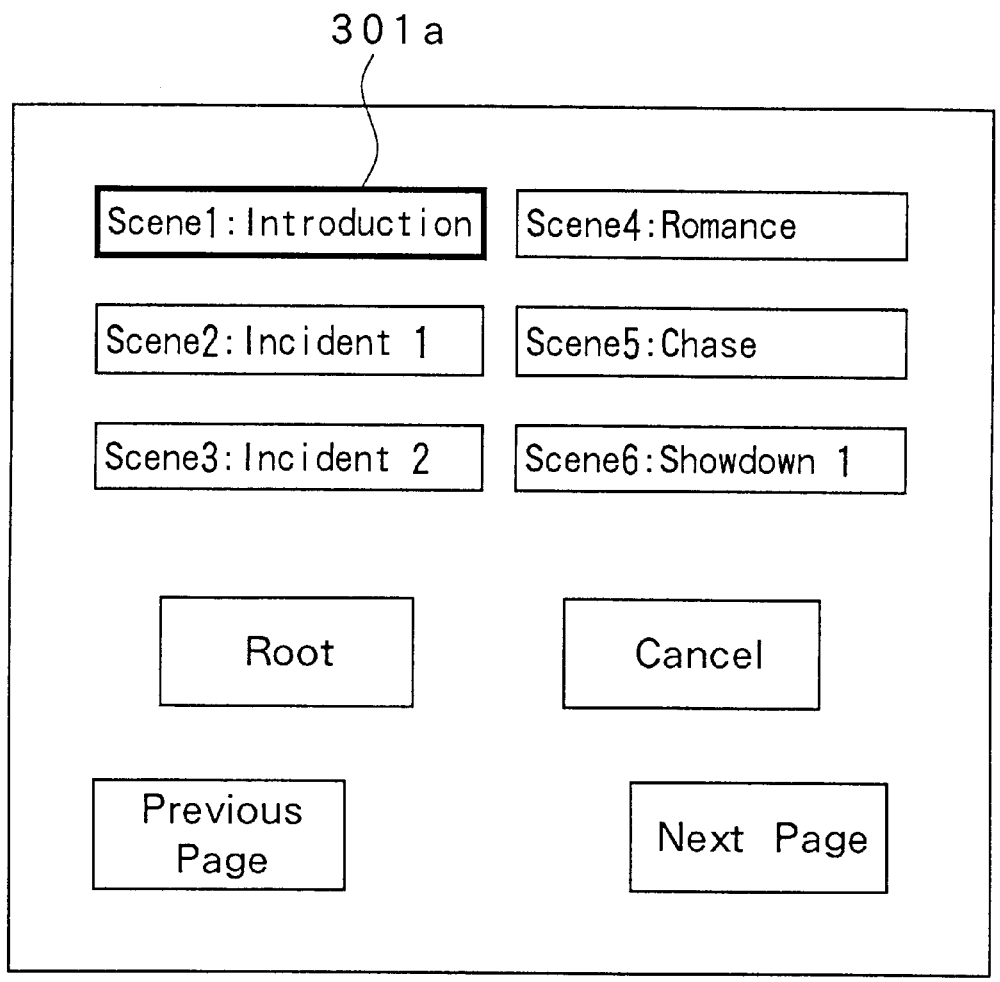
FIG. 13 illustrates an example of a menu of a DVD wherein a menu button is highlighted.

According to the DVD format, the color of the selected button is changed or the selected button is framed so as to indicate which button is selected on the screen. Such indication will be called highlighting in the following description. FIG. 13 shows an example of menu wherein one of the menu buttons is highlighted. As shown, the upper-left button 301a of the six chapter designation buttons 301 is highlighted.

Highlighting includes two types. One is select highlighting for indicating that the operation button in the menu is only temporarily selected. The other is action highlighting for indicating that the menu enter key 148 is pressed to be effective for about one second after the menu enter key 148 is pressed until immediately before the operation is performed. In the example shown in FIG. 13, if the menu enter key 148 is pressed when the upper-left button 301a is in the state of select highlighting, the highlight color turns into the action highlighting state for about one second. The display then directly jumps to the chapter of 'Scene 1: Introduction' where a replay is started.

Figure 14:
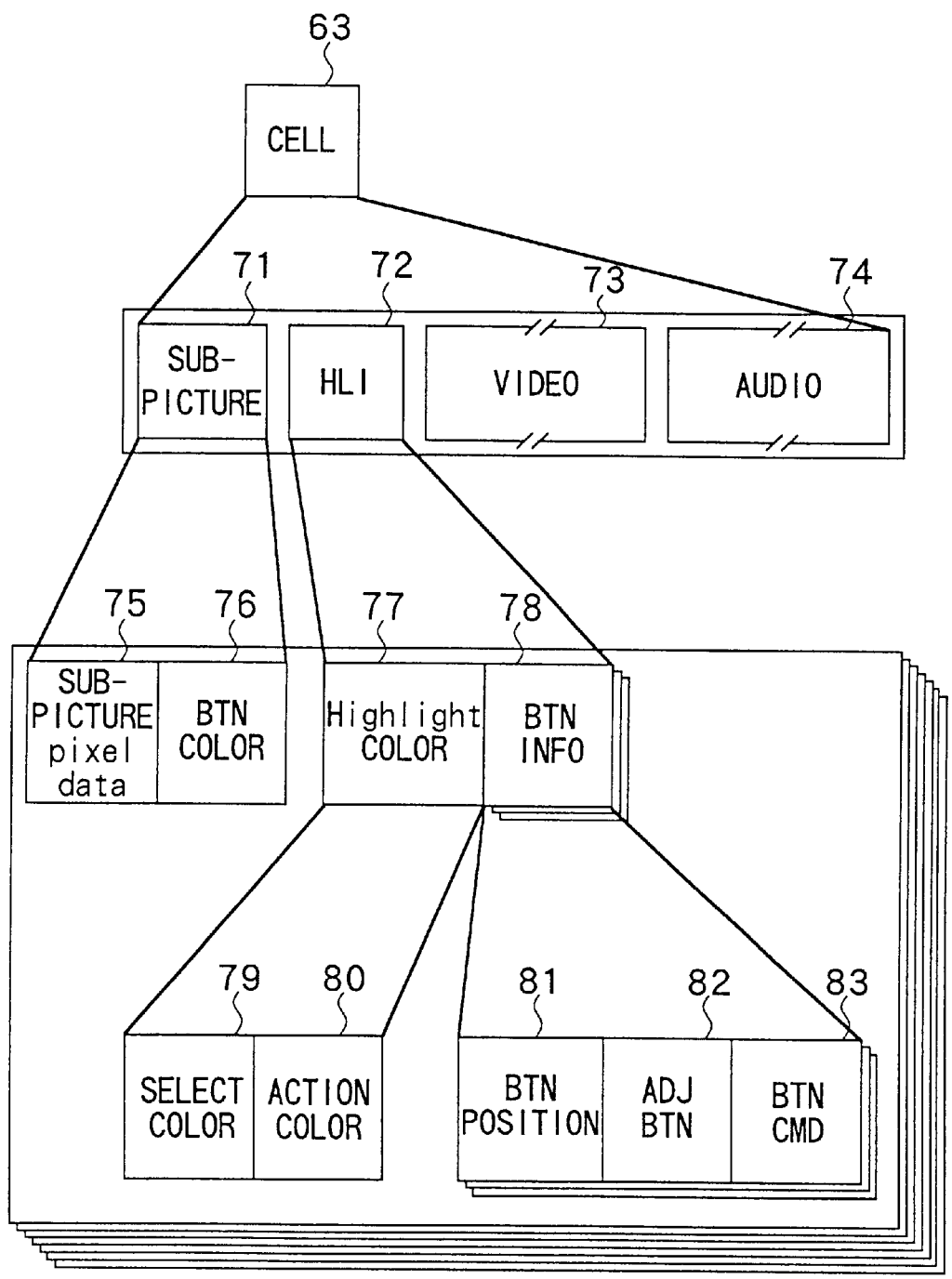
FIG. 14 illustrates the data structure of cell of the DVD.

FIG. 14 shows a data structure of the cell 63 in the multiplexed VOB 62 for implementing such a menu of the DVD. Although the data structure for implementing the menu is determined by the entire PGC, the structure for implementing the menu buttons will be only described.

For example, if the menu includes a plurality of pages, each menu page is made of the single cell 63. The cells 63 corresponding to the number of the pages form the VOB 62 shown in FIG. 7 altogether. As shown in FIG. 14, the cell 63 is composed of the following elements.

1. Cell

The single cell 63 includes all the display data corresponding to one page of menu and control data of the menu button. The cell 63 includes a subpicture 71, a display image of the menu button, as the display data. The cell 63 further includes a highlight information data (shown as HLI) 72 as control data of the menu button. Video data (shown as VIDEO) 73 for a background of the menu is multiplexed in the cell 63. Furthermore, if the a menu is a (moving or still) picture with audio, audio data (shown as AUDIO) 74 is multiplexed in the cell 63. If the video data is of a still-frame image, the menu is a still-frame menu. If the video data is of a moving image, the menu is a moving picture menu.

2. Subpicture

The subpicture 71 is a region where pixel data and color information for displaying the menu are stored. The subpicture 71 includes a subpicture pixel data 75 and button color data (shown as BTN COLOR) 76 to be described later on.

3. Highlight Information Data (HLI)

Highlight information data 72 is a region where information relating to selection of the menu buttons on the menu is stored. The highlight information data 72 includes highlight color data 77 and button information data (shown as BTN INFO) 78. The highlight color data 77 includes color information for changing (highlighting) the color of one of the menu buttons being selected on the menu for indicating the selection and color information for changing the color of the menu button when the function assigned to the selected button is executed. The button information data 78 includes: relative positions of the menu buttons on the menu; adjacent information among the menu buttons that is required for indicating the menu button to be selected next when the selected menu button on the menu is vertically and horizontally shifted with the cursor key of the remote controller of the DVD player; and the navigation command provided for the menu button, used when the operation of the menu button is determined.

4. Subpicture Pixel Data

Pixel data for displaying the menu buttons is stored in subpicture pixel data 75. If the menu includes a plurality of pages, the pixel data is provided for the corresponding pages.

5. Button Color Data

The button color data 76 retains color information of pixel data of the subpicture for displaying the menu when not selected (not highlighted) and data indicating a color palette as a reference for color information when the menu button is highlighted.

6. Highlight Color Data

The highlight color data 77 retains color information for highlighting the menu buttons on the menu. The color information includes select color data 79 indicating the highlight color when the menu button is selected and action color data 80 indicating the highlight color of the menu button when the function assigned to the selected menu button is executed. Each of the color data 79 and 80 is a pointer to the data indicating the color palette in the button color data 76 and does not retain actual color data.

7. Button Information Data

The button information data 78 includes: button position data (shown as BTN POSITION) 81 for indicating relative positions of the menu buttons on the menu; adjacent button data (shown as ADJ BTN) 82 for indicating the adjacent menu buttons that is required for indicating the menu button to be selected next when the selected menu button on the menu is vertically and horizontally shifted with the cursor key of the remote controller of the DVD player; and a button command (shown as BTN CMD) 83 made up of the navigation command for executing the function assigned to the menu button. The button information data 78 plays a key role as a section for describing functional logics of the menu buttons on the menu.

8. Select Color Data

The select color data 79 retains a pointer to the color palette of the highlight color when the menu button is selected.

9. Action Color Data

The action color data 80 retains a pointer to the color palette of the highlight color of the menu button when the function assigned to the menu button is executed.

10. Button Position Data

The button position data 81 indicates the relative positions of the menu buttons on the menu with coordinates of the pixels. To be specific, since the logical display region of each menu button is defined as a rectangle, the button position data 81 includes the coordinates of the top-left corner and the bottom-right corner of the region. The button position data 81 further includes a pointer to the color palette of color information when the menu button is not selected. On the single menu, the color indicating that the button is not selected is defined as one regardless of the number of the menu buttons. The button position data 81 further includes an auto-action flag as auto-action information indicating whether to automatically perform the function assigned to each menu button when the menu button is selected.

11. Adjacent Button Data

The adjacent button data 82 retains adjacent information among the menu buttons that is required for indicating the menu button to be selected next when the selected menu button on the menu is vertically and horizontally shifted with the cursor keys of the remote controller of the DVD player.

12. Button Command

The button command 83 is the navigation command for executing the functions assigned to the menu buttons and directly defines the functions.

Figure 15:
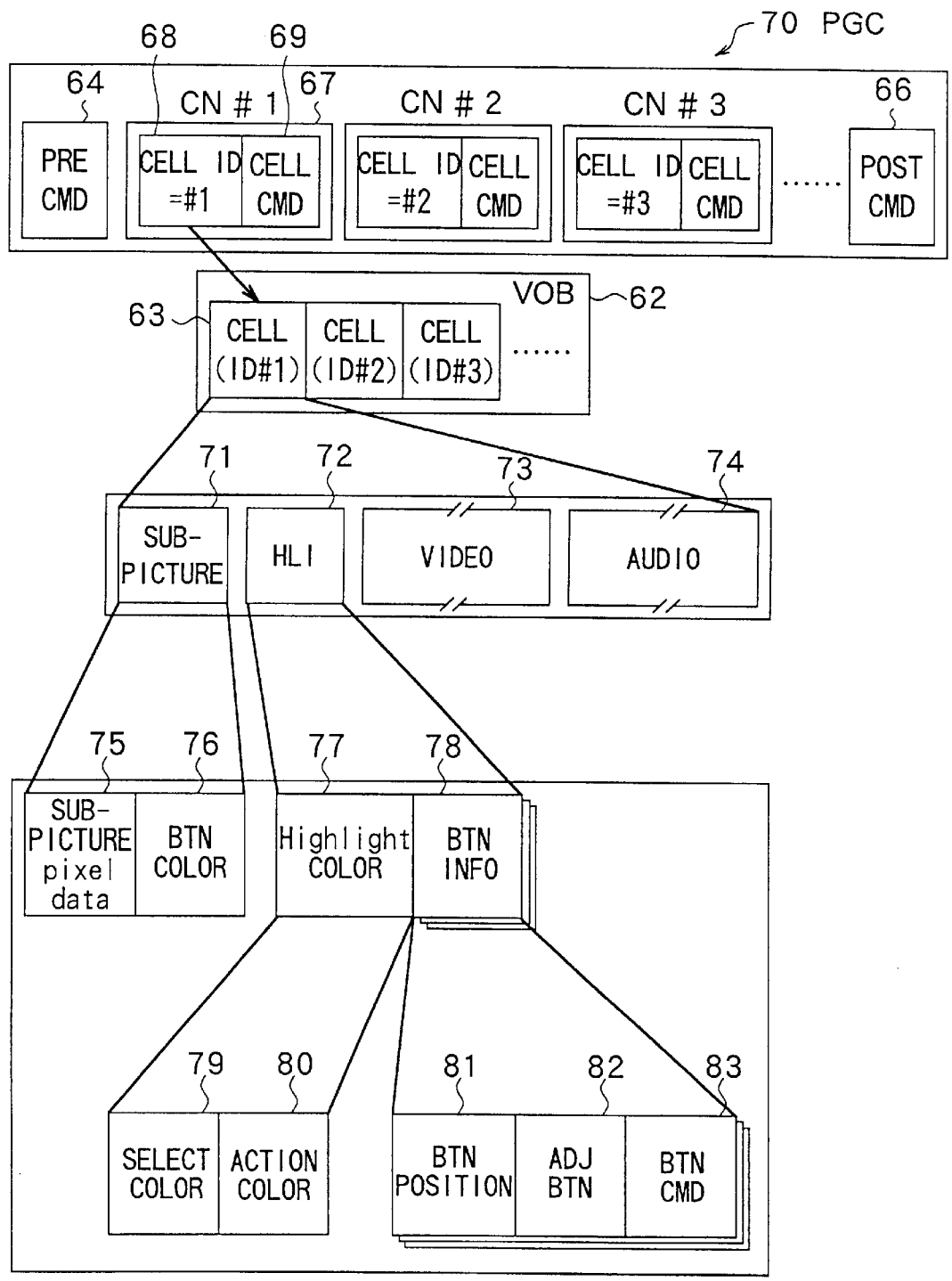
FIG. 15 illustrates the data structures of VOB, PGC and menu of the DVD.
Figure 16:
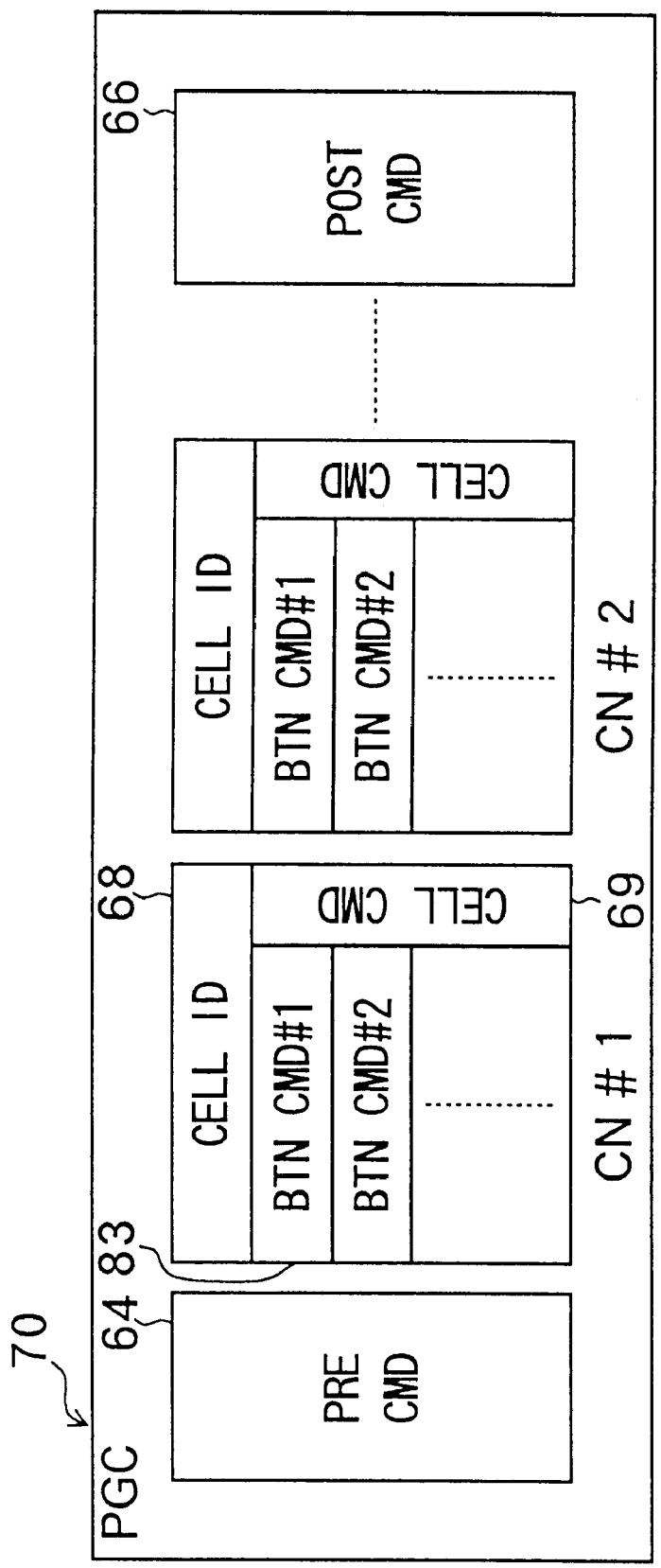
FIG. 16 is a schematic view of the structure of PGC shown in FIG. 15.

Reference is now made to FIG. 15 illustrating the data structure of the VOB, the PGC and the menu described so far. As shown, the PGC 70 corresponding to a menu control data item of the invention includes the cell information sections 67 of the cell numbers CN #1, #2, #3 and so on. In FIG. 15, the cell ID numbers of the cell numbers CN #1, #2, #3 and so on are #1, #2, #3 and so on, respectively. The cell 63 of the VOB 62 represented by the cell information section 67 includes display data of the menu (video data as a background of the menu, audio data and subpicture data) and highlight information data (HLI) as control data of the menu buttons. FIG. 15 shows the data for menu display included in the cell 63 of cell ID #1. In order to display a single menu, such a complicated hierarchical data structure is required. However, if attention is focused on the navigation command for controlling the mechanism of the menu and a replay of a title, the items relating to menu display are the PRE CMD 64, the cell CMD 69, the POST CMD 66 and the BTN CMD 83. Accordingly, for convenience, the structure of the PGC 70 is only represented by the cell ID 68 indicating correspondence to the cell 63 in addition to the navigation commands as shown in FIG. 16. The BTN CMDs #1, #2 and so on in FIG. 16 indicate that the number of BTN CMDs in the corresponding menu page is equal to the number of the menu buttons. Although the BTN CMD 83 is included in the cell 63 in the strict sense, the BTN CMD 83 is included in the PGC 70 for convenience in FIG. 16.

Figure 2:
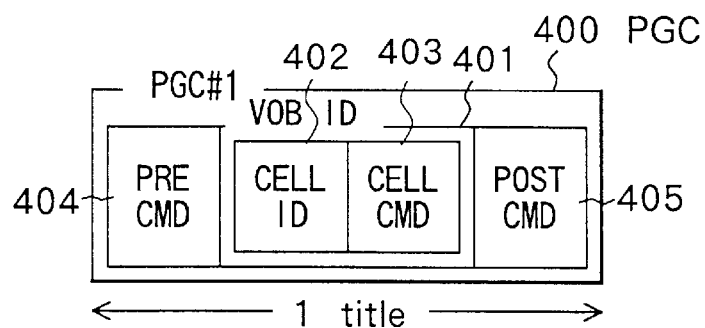
FIG. 2 illustrates the data structure of a related-art DVD for a musical product.
Figure 3:
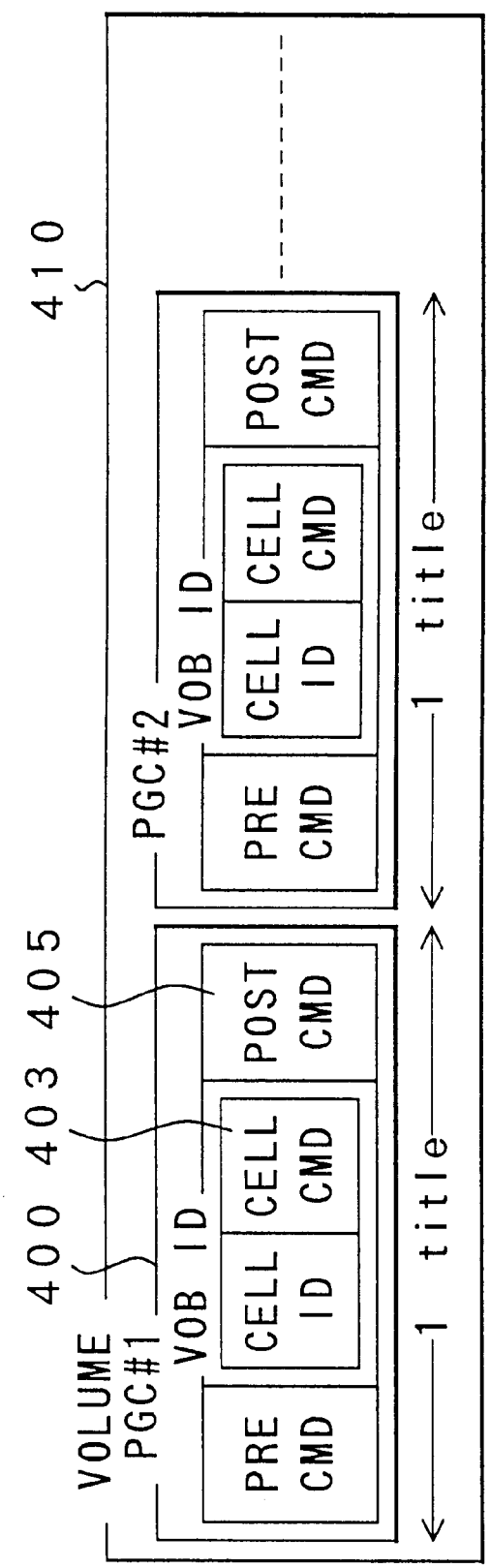
FIG. 3 illustrates the data structure of an entire disk wherein the PGCs shown in FIG. 2 are arranged side by side.

Before describing the data structure of the DVD of the embodiment of the invention, the data structure of a related-art DVD will be described for comparison. FIG. 2 schematically illustrates the data structure of the related-art DVD for a musical product. A PGC 400 shown in FIG. 2 is made up of a VOB ID 401, a PRE CMD 404 and a POST CMD 405 as navigation commands. The VOD ID 401 includes a cell ID 402 and a cell CMD 403. The cell in the VOB where multiplexed video and audio data is stored is identified by the cell ID 402. On the related-art DVD for a musical product such as karaoke, the single PGC represents one title, that is, one piece of music (tune). As shown in FIG. 3, an entire disk 410 (shown as VOLUME) is made up of PGCs for all the tunes (all the titles) arranged in sequence. In the POST CMD 405 of each PGC 400, an instruction to jump to the menu is written.

Such a structure allows easy authoring since only one type of PGC structure is required regardless of the number of tunes (titles). However, the data structure has the following three problems in replay by the DVD player.

(1) The data structure does not allow fast forward and fast reverse across tunes since the DVD format prohibits a direct access across PGCs, that is, a jump to another PGC while one PGC is being replayed.

(2) The PGC being replayed by the DVD player only includes the cell corresponding to the tune being replayed. If the only cell is defined as PTT, the next or previous tune is PTT included in another PGC. A skip across the tunes by operating the next skip key or the previous skip key is thus disabled.

(3) The DVD format defines that a display of replay time of a DVD player is made through adding up the replay time of the individual cells in sequence in the PGC. Consequently, the replay time display is reset to zero at the start point of each PGC and no display is provided for indicating the elapsed replay time throughout the disk. Therefore, random access to a specific point in a specific tune by inputting time at which a replay is started is not achieved.

In order to solve problem (2), for example, a method called multi-PGC is provided for representing each tune by one PGC on a DVD for a musical product, instead of representing one title by one PGC, and organizing the one title made up of the PGCs for all the tunes. The multi-PGC allows fast reverse and a next skip across the tunes by writing an instruction to jump to the next PGC in the POST CMD of each PGC. When the multi-PGC is used, however, a jump is only allowed to the start of the PGC being replayed although a jump to the previous PGC is intended. Therefore, fast reverse and a previous skip are not allowed.

According to the definition of the DVD format, there is no display of replay time in the multi-PGC. Consequently, a display of time required for a tune is not obtained, either. The problem of (3) is thus extended to worse.

Figure 1:
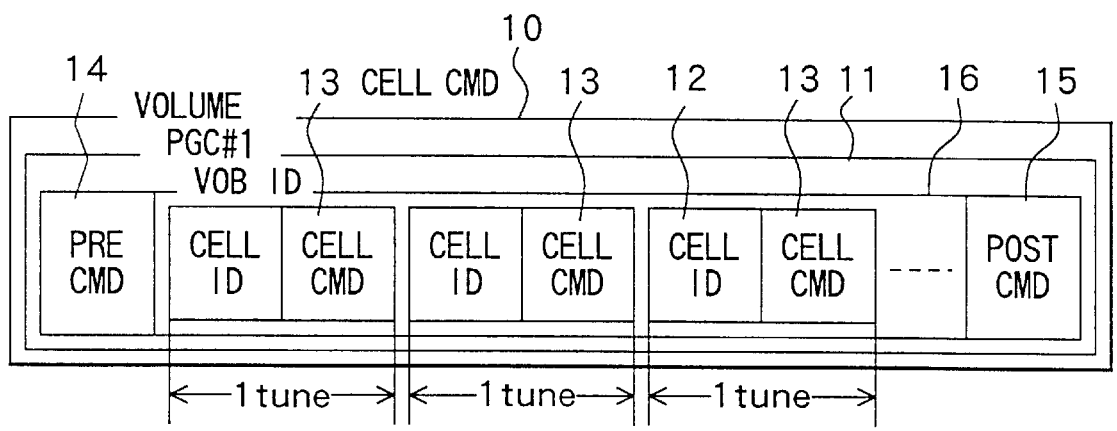
FIG. 1 illustrates the data structure of a DVD of an embodiment of the invention.

In order to overcome the drawbacks described above, the feature of the embodiment of the invention is that the entire disk is made up of a single PGC and the contents are sectioned from one another so that each content corresponds to a cell. FIG. 1 shows the data structure of the DVD for a musical product, for example. In the data structure each tune as a content is represented as one cell. Each cell is defined as PTT. A disk 10 includes only one PGC 11. The PGC 11 includes: a VOB ID 16 corresponding to VOB including cells representing tunes; a PRE CMD 14; and a POST CMD 15. The VOB ID 16 includes a cell ID 12 and a cell CMD 13 for each tune. In the cell CMD 13 a command for jumping to a tune selection menu (a command for calling up the chapter menu in the embodiment wherein the tune selection menu is implemented by the chapter menu) is written. The cell CMD 13 is thereby executed at the point of completion of a normal replay of a tune and a jump to the tune selection menu is allowed every time each tune is completed.

In such a data structure of the embodiment of the invention, each tune is not divided into PGCs. Consequently, there is no restriction on fast forward and fast reverse. As a result, fast forward and fast reverse at any point during a replay is allowed. In addition, fast forward, reverse and fast reverse across tunes are allowed since the cell CMD may be executed when a replay is performed in general and execution of the cell CMD is prohibited during fast forward, reverse and fast reverse, according to the DVD format. For example. even though a tune comes to the end during fast forward, the cell CMD is not executed but fast replay of the next cell may be continued.

Since each tune is defined as PTT in the embodiment, a skip implemented with the next skip key and the previous skip key is achieved as well. There is no chance of jumping to the tune selection menu during a skip since the DVD format provides that execution of the cell CMD is prohibited during a skip.

Furthermore, since the entire disk is represented by a single PGC in the embodiment, the DVD format ensures that elapsed time is added up in order of replay of the cells, the time at which the first tune starts being defined as zero. As a result, random access to a specific point in a specific tune by inputting time at which a replay is started is achieved.

The tune selection menu of the embodiment of the invention will now be described. The tune selection menu is a chapter menu including menu buttons for allowing a jump to each tune. The tune selection menu of the embodiment includes a menu picture having a plurality of pages each including a menu button for selecting a tune or more. The tune selection menu has a function of automatically selecting and displaying the menu on which a menu button is arranged for selecting the immediately preceding replayed tune at the point of completion of the normal replay of the tune. The tune selection menu further has a function of highlighting the menu button indicating the immediately preceding replayed tune. An instruction to shift is written in the cell CMD described above executed at the end of each tune. However, information accompanying a shift is not allowed to be added to the instruction to shift. Therefore, it is only possible to write a navigation command for displaying the first menu picture of the tune selection menu (the chapter menu in the embodiment) in the cell CMD. It is thus required that the tune selection menu includes a navigation command for determining from which tune the status returns to the chapter menu, jumping to the corresponding menu picture, and highlighting the corresponding menu button.

Figure 4A:
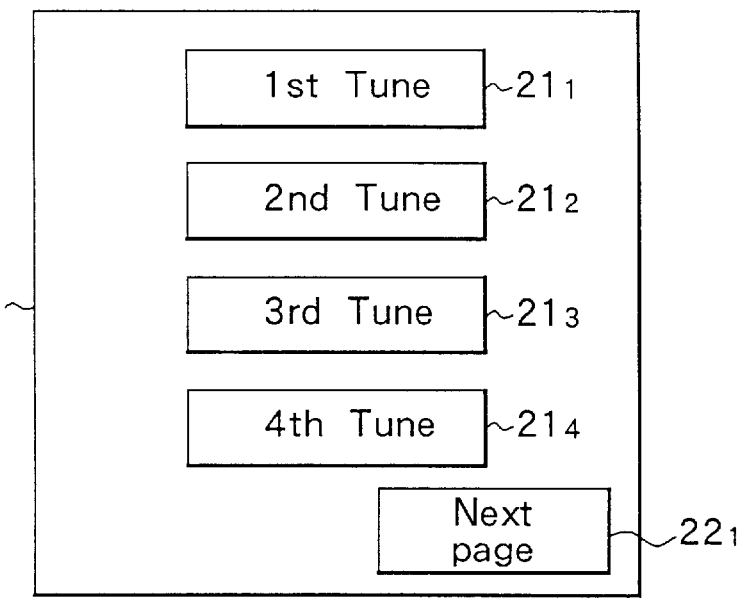
FIG. 4A and FIG. 4B illustrate menu pictures of the embodiment of the invention.
Figure 4B:
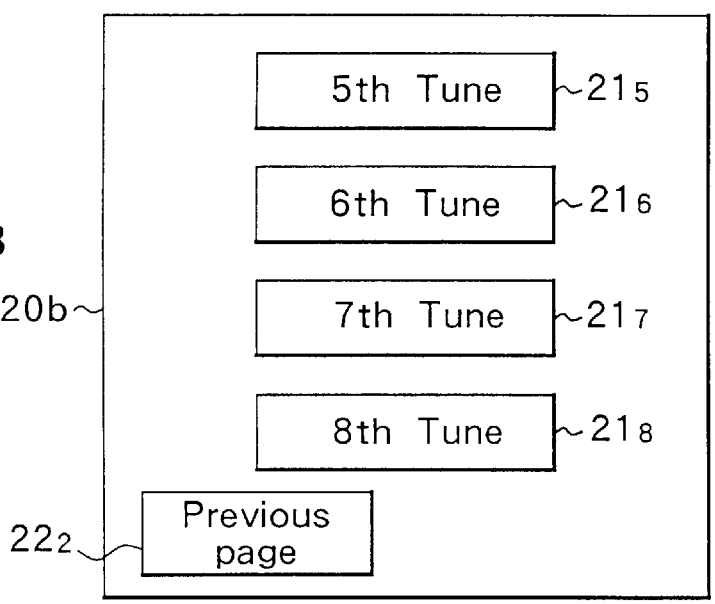

FIG. 4A shows a tune selection menu including two pages of the DVD containing a total of eight tunes. Each page of the tune selection menu has menu buttons for four tunes. That is, as shown in FIG. 4A, menu buttons $21_1$ to $21_4$ for jumping to the first to fourth tunes are arranged on a menu picture 20a of a first page. As shown in FIG. 4B, menu buttons $21_5$ to $21_8$ for jumping to the fifth to eighth tunes are arranged on a menu picture 20b of a second page. The menu picture 20a includes a next page button $22_1$ for jumping to the menu picture 20b. The menu picture 20b includes a previous page button 222 for jumping to the menu picture 20a. In an operation of the tune selection menu, for example, at the completion point of a replay of the second tune, the menu button $21_2$ of the second tune on the menu picture 20a is highlighted. At the completion point of a replay of the sixth tune, the menu button $21_6$ of the sixth tune on the menu picture 20b is highlighted.

The structure of PGC and programming of navigation commands for implementing the operation described above will now be described. Although the menu structure requires information including the subpicture pixel data, the button color data, the select color data, the action color data, the button position data and the adjacent button data, such information does not directly relate to the present invention and detailed description thereof is omitted. Programming not contradicting the description of the invention is assumed to be made in the embodiment. For example, the programming includes: colors that are not transparent are designated for the color data; the initially highlighted menu button is any of the menu buttons $21_1$ to $21_4$ and the next page button $22_1$; and the adjacent button data includes the vertical relationship only.

The structures of VOB and PGC as the data structure will now be described wherein the menu shown in FIG. 4 is implemented as the chapter menu of the DVD system menus.

Figure 5:
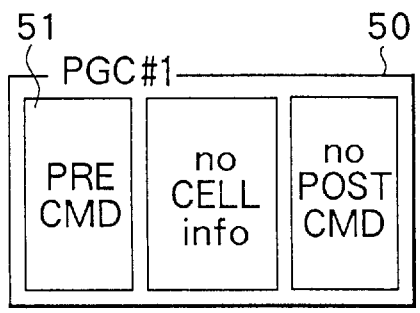
FIG. 5 illustrates the PGC structure of a root menu of the embodiment of the invention.

As previously described, if the DVD system menu includes any of the chapter menu, the audio menu, the subtitle menu and the angle menu, the DVD system menu requires the root menu that is a specific menu for calling up the menu. Accordingly, a PGC for the root menu which is the logical structure of the root menu is required. FIG. 5 shows the structure of a PGC (PGC #1) 50 for the root menu. The PGC 50 for the root menu does not have any menu page to display as the root menu so that the PGC 50 does not have any corresponding VOB and cell. The PGC 50 is therefore a special form of PGC consisting only of the PRE CMD 51 of the navigation commands. In the DVD format such a PGC is called dummy PGC.

Figure 6:
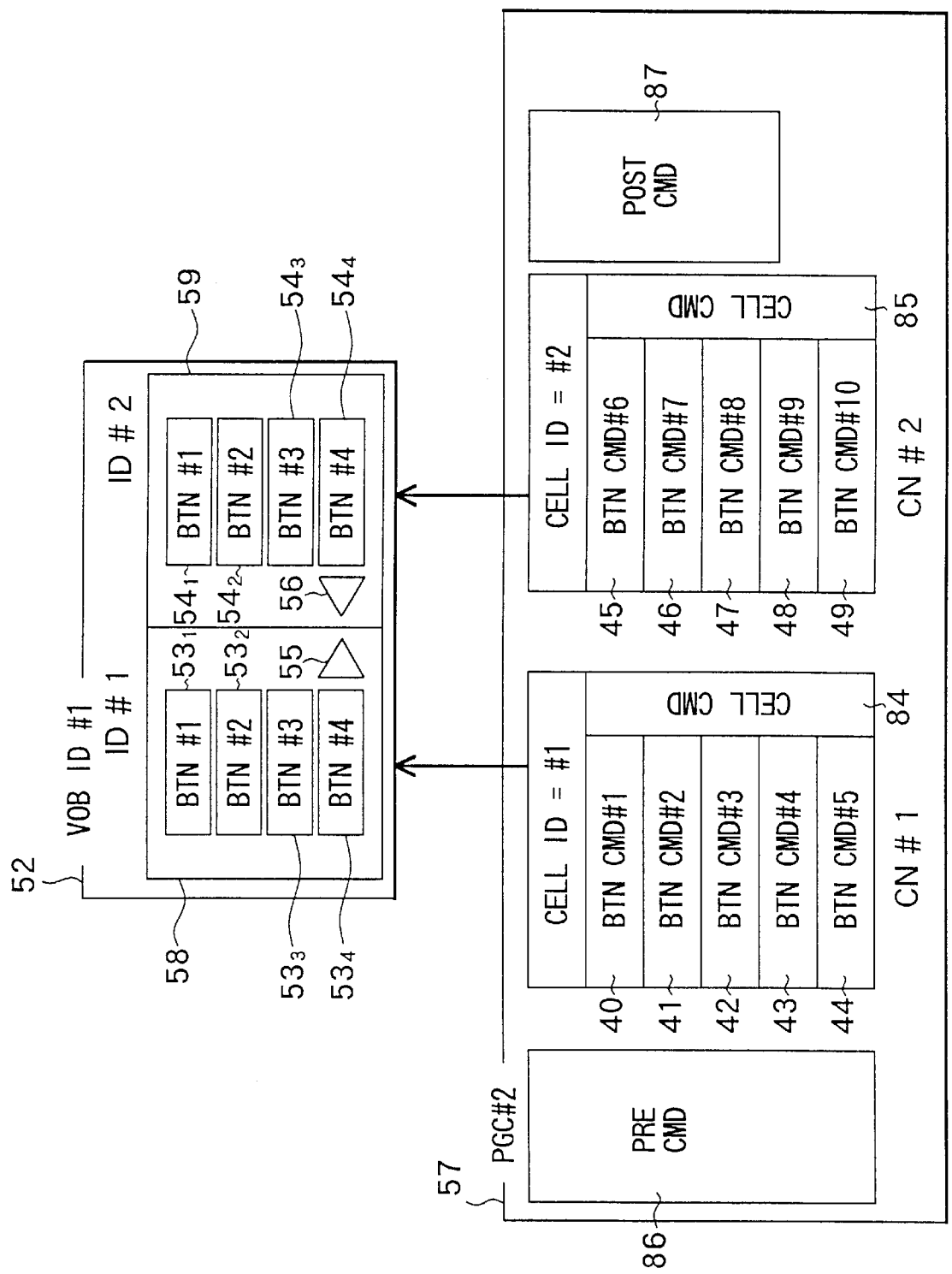
FIG. 6 illustrates the data structure of a VOB for the chapter menu and the PGC structure for organizing the menu shown in FIG. 4.

FIG. 6 shows the structures of VOB and PGC of the menu shown in FIG. 4. Video signals as the background, audio signals and subpicture signals for the menu buttons, which are actually replayed as the chapter menu, are multiplexed as a series of data items in a VOB (VOB ID #1) 52 for the chapter menu. The VOB 52 includes two cells 58 and 59 with cell numbers CN #1 and CN #2. In FIG. 6 cell ID numbers of the cells 58 and 59 with cell numbers CN #1 and CN #2 are #1 and #2, respectively. Image data items of tune selection buttons (BTN #1 to #4) $53_1$ to $53_4$ of the first to fourth tunes of the menu picture 20*a* of the first page are recorded in the cell 58 whose cell ID is #1. As the menu picture 20*a*, image data items of tune selection buttons (BTN #1 to #4) $54_1$ to $54_4$ of the fifth to eighth tunes of the menu picture 20*b* of the second page are recorded in the cell 59 whose cell ID is #2. Image data of an arrow button 55 for page feed corresponding to the next page button $22_1$ of the menu picture 20*a* is recorded in the cell 58. Image data of an arrow button 56 for page feed corresponding to the previous page button 222 of the menu picture 20*b* is recorded in the cell 59.

A PGC 57 for the chapter menu is allocated to the VOB 52 for the chapter menu. The PGC 57 includes information items relating to the two cells 58 and 59. The information items are each defined as follows so as to correspond to the cells 58 and 59, respectively, of the VOB 52 for the chapter menu described above. The cell ID of the cell 58 is #1. The cell ID of the cell 59 is #2. Since there are five menu buttons on the menu picture 20*a* of the first page corresponding to the cell 58, regions of five BTN CMD (#1 to #5) 40 to 44 are provided. The BTN CMD (#1 to #5) 40 to 44 each correspond to the tune selection buttons $53_1$ to $53_4$ and the arrow button 55, respectively. Since there are five menu buttons on the menu picture 20*b* of the second page corresponding to the cell 59, regions of five BTN CMD (#6 to #10) 45 to 49 are provided. The BTN CMD (#6 to #10) 45 to 49 each correspond to the tune selection buttons $54_1$ to $54_4$ and the arrow button 56, respectively. Although the information relating to the cells 58 and 59 includes regions of the cell CMD 84 and 85 for controlling a replay, the regions are not used in the embodiment of the invention. Furthermore, the PGC 57 includes a region of the PRE CMD 86 and a region of the POST CMD 87. The DVD format provides that the reference numbers of the menu buttons are assigned for each cell, starting at 1, regardless of the total number of BTN CMD.

The contents of the navigation commands will now be described for implementing the menu shown in FIG. 4 as the chapter menu of the DVD system menus. For description of the navigation commands, the DVD format prescribes that the cell CMD and the BTN CMD are written on one line. Although a combination of a plurality of cells is called program (PG), a PG consisting of a single cell may be implemented without any substantial problem. For brevity, a PG consisting of a single cell is thus provided in the embodiment of the invention. Furthermore, some navigation commands are required to be described with a PG number instead of a cell number (CN) and a PG number and a cell number should be distinguished from each other in the strict sense. However, since a PG consisting of a single cell is provided in the embodiment, what a cell number and a PG number specify is identical.

For the cell, it is required that information such as a seamless flag, a cell type, a block type and still time should be written in the PGC information table. Since such information does not directly relate to the invention, description thereof is omitted. In the embodiment the information is determined so that it does not contradict the structures of PGC and cell. The still time is the infinite since the still-frame menu is assumed in the embodiment.

As shown in FIG. 5, the PRE CMD 51 is only written in the PGC 50 for the root menu without any menu page to display. The content of the PRE CMD 51 is an instruction to shift to the chapter menu.

As shown in FIG. 6, the PGC 57 for the chapter menu includes: the PRE CMD 86, the BTN CMD 40 to 49 for the respective menu buttons; and the POST CMD 87.

The PRE CMD 86 is the most important command in the embodiment. The DVD format provides that a register region called system parameter is provided in a DVD player with a reference number common to any DVD player. In system parameter number 7 (SP7), a PTT number (or a cell number since there is one-to-one correspondence between a cell and a PTT in the embodiment) replayed during a replay of a title or immediately before a display of the menu picture 20*a* or 20*b*, that is, a tune number is stored. Through the use of this fact, which button of which menu picture to highlight is determined in the embodiment. The DVD format provides that the reference numbers of the menu buttons are assigned for each cell, starting at 1, regardless of the total number of button commands. Consequently, the reference number of the menu button indicating the fifth tune is BTN #1 of the cell 59.

The content of the PRE CMD 86 is as follows. The numeral written in SP7 is determined to know the PTT number replay ed immediately before the display of the menu picture. If SP7 is 4 or below, the reference number of the button to highlight is made equal to the value of SP7 and the operation shifts to the cell 58. If SP7 is 5 or above, the reference number of the button to highlight is set to the value of SP7 from which four is subtracted and the operation shifts to the cell 59.

The contents of the BTN CMD (#1 to #5) 40 to 44 in the cell 58 of cell ID #1 are as follows.

The content of the BTN CMD (#1) 40 is an instruction to shift to chapter 1.

The content of the BTN CMD (#2) 41 is an instruction to shift to chapter 2.

The content of the BTN CMD (#3) 42 is an instruction to shift to chapter 3.

The content of the BTN CMD (#4) 43 is an instruction to shift to chapter 4.

The content of the BTN CMD (#5) 44 is an instruction to shift to the next menu page, that is, the cell 59 of cell number CN #2 corresponding to the menu picture 20*b* of the second page.

The contents of the BTN CMD (#6 to #10) 45 to 49 in the cell 59 of cell ID #2 are as follows.

The content of the BTN CMD (#6) 45 is an instruction to shift to chapter 5.

The content of the BTN CMD (#7) 46 is an instruction to shift to chapter 6.

The content of the BTN CMD (#8) 47 is an instruction to shift to chapter 7.

The content of the BTN CMD (#9) 48 is an instruction to shift to chapter 8.

The content of the BTN CMD (#10) 49 is an instruction to shift to the previous menu page, that is, the cell 58 of cell number CN #1 corresponding to the menu picture 20*a* of the first page.

There is no instruction corresponding to the POST CMD 87.

The navigation commands described so far implement control of the replay operation described above.

Figure 17:
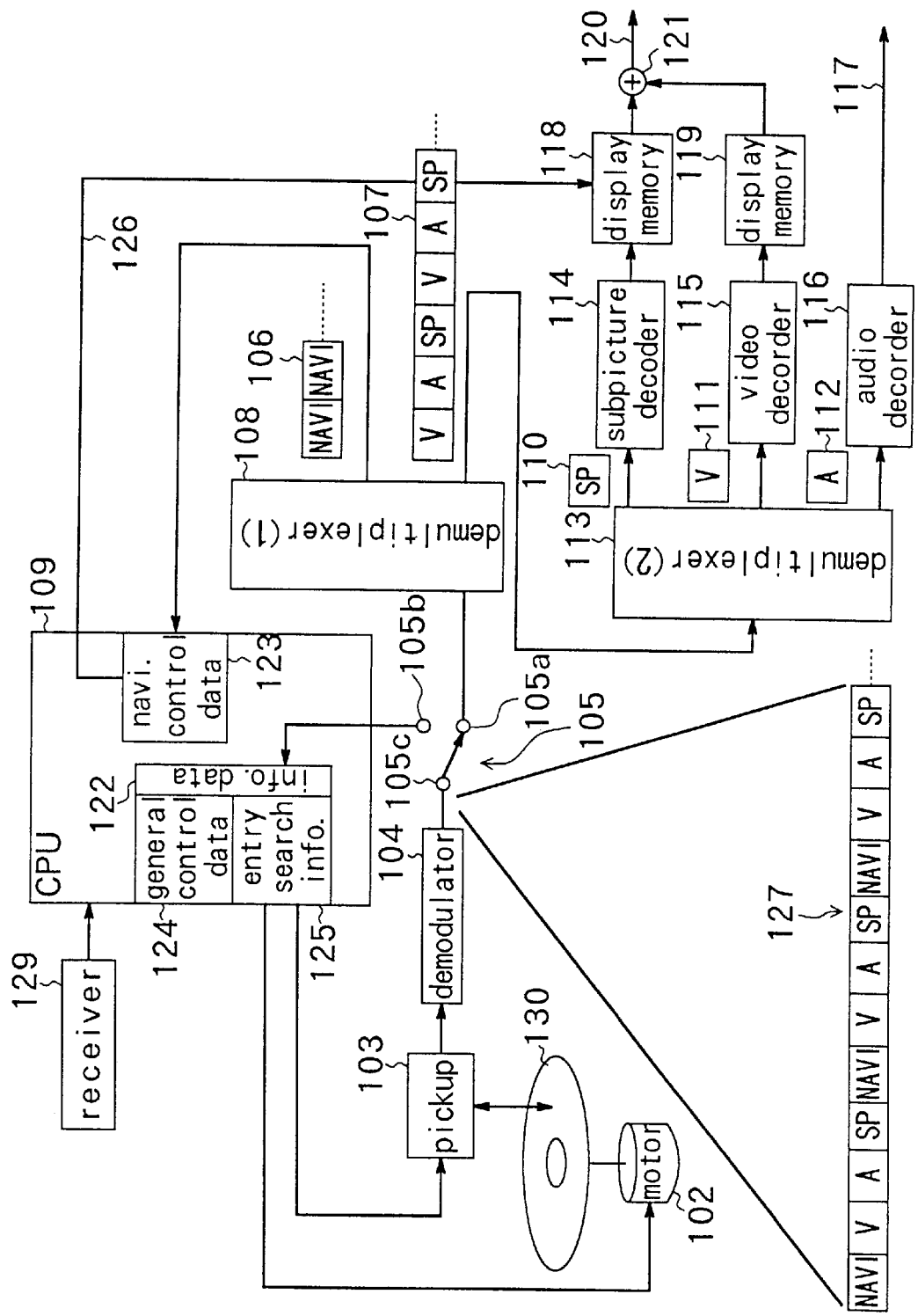
FIG. 17 is a block diagram of an example of the DVD player of the embodiment of the invention.

Referring to FIG. 17, an example of the configuration of the DVD player as a data replay apparatus of the embodiment will be described. The DVD player shown comprises: a motor 102 for rotating a DVD 130; a pickup 103 placed to face the DVD 130 rotated by the motor 102 for detecting information recorded on the DVD 130; a demodulator 104 for demodulating and outputting signals outputted from the pickup 103; and a switch 105 including two fixed contacts 105*a* and 105*b* and a moving contact 105*c* coupled to the output of the demodulator 104. The pickup 103 optically reads information recorded on the DVD 130 through applying light to the DVD 130 and detecting return light. The pickup 103 includes a drive apparatus for controlling a position on the DVD 130 at which information is read through shifting an application point of light onto the DVD 130 along the radius of the DVD 130.

The DVD player further comprises a demultiplexer (1) 108 whose input is coupled to the fixed contact 105*a* of the switch 105. The demultiplexer (1) 108 divides output signals of the demodulator 104 received through the switch 105 into navigation packs (shown as NAVI) 106 for controlling a replay method of the DVD player and presentation data 107 which is information to be provided for the viewer. The DVD player further comprises a central processing unit (CPU) 109 as a computer of the invention for receiving signals from the fixed contact 105*b* of the switch 105 and the navigation packs 106 from the demultiplexer (1) 108 and for controlling the motor 102, the pickup 103 and the switch 105. The CPU 109 includes a read only memory (ROM) retaining a program and a random access memory (RAM) as a work area. The CPU 109 performs operations described below by implementing the program stored in the ROM with the RAM as the work area.

The DVD player further comprises: a demultiplexer (2) 113 for dividing the presentation data 107 from the demultiplexer (1) 108 into a coded subpicture signal (shown as SP) 110, a coded video signal (shown as V) 111 and coded audio data (shown as A) 112; a subpicture decoder 114 for decoding the subpicture signal 110 from the demultiplexer (2) 113; a video decoder 115 for decoding the video signal 111 from the demultiplexer (2) 113; an audio decoder 116 for decoding the audio signal 112 from the demultiplexer (2) 113 and outputting an audio output signal 117; a display memory 118 for storing the decoded subpicture signal from the subpicture decoder 114 and generating a subpicture; a display memory 119 for storing the decoded video signal from the video decoder 115 and generating a moving picture; and an adder 121 for adding output signals of the display memories 118 and 119 and outputting a video output signal 120.

The CPU 109 includes, in the RAM, an information data storage 122 for storing information data, and a navigation control data storage 123 for storing navigation control data included in the navigation packs 106. The information data storage 122 includes a general control data storage 124 for storing general control data, and an entry search information storage 125 for storing entry search information. The information data is inputted through the switch 105. The CPU 109 sends a highlight display control signal 126 to the display memory 118. The highlight display control signal 126 controls highlighting of the subpicture stored in the navigation control data storage 123.

The DVD player further comprises a receiver 129 for receiving a signal from the remote controller 92, manipulating the signal for conversion to a signal corresponding to the key operation of the remote controller 92 and sending the signal to the CPU 109.

The operation of the DVD player shown in FIG. 17 will now be described. Loading of information data by the DVD player will be first described. The CPU 109 has the switch 105 switched to the fixed contact 105*b* and loads general control data and entry search information from the DVD 130 by activating the pickup 103 and the motor 102 with servo control. The CPU 109 has the general control data and the entry search information stored in the storage 124 and 125, respectively. The general control data includes static information required for replay such as the aspect ratio of the video and the type of coding and the number of channels of the audio. The entry search information is a table of information of addresses on the DVD 130 where the multiplexed data of each menu page and the multiplexed data of each title are located. Using the entry search information, the DVD player moves the pickup 103 to the designated address of the selected menu or title and starts a replay.

The operation of menu replay by the DVD player will now be described. The CPU 109 has the switch 105 switched to the fixed contact 105*a* and determines the initial address of the menu from the entry search information. The CPU 109 activates the pickup 103 and the motor 102 and obtains a replay signal from the pickup 103 so as to load information of the menu. The replay signal is restored to normal digital signals by the demodulator 104 to be a replay stream 127. Being enlarged schematically, the replay stream 127 looks like a navigation pack (NAVI), a video signal (V), an audio signal (A) and a subpicture signal (SP) multiplexed in sequence.

Next, the replay stream 127 outputted from the demodulator 104 is divided into the navigation packs 106 and the presentation data 107 by the demultiplexer (1) 108. The navigation packs 106, one of the divided data, is stored in the storage 123 in the CPU 109. Since the navigation packs 106 include the highlight information data 72 shown in FIG. 14, instructions for replaying the menu (the adjacent button data 82, the button command 83 and so on in FIG. 14) are stored in the CPU 109 as well in this stage.

The presentation data 107, the other of the data divided by the demultiplexer (1) 108, is further divided into the subpicture signal 110, the video signal 111 and the audio signal 112 by the demultiplexer (2) 113. The signals are each restored to a decoded subpicture signal, a decoded video signal and a decoded audio signal by the respective decoders 114 to 116. The subpicture signal outputted from the decoder 114 and the video signal outputted from the decoder 115 are each temporarily stored in the display memories 118 and 119, respectively. The subpicture signal and the video signal are then added to each other at the adder 121 and outputted as the video output signal 120. The highlight display control signal 126 is given to the display memory 118 from the CPU 109. For shifting a highlighted button on the menu by operating the cursor keys of the remote controller 92, for example, the CPU 109 directly rewrites the data corresponding to highlighting in the display memory 118, using the highlight display control signal 126. The visual effect of highlight color shifting is thereby achieved.

As previously described, the PGC of each menu is recorded on the disk as the PGC information table as part of the area called general control data. The general control data on the disk is loaded in the CPU 109 and stored in the storage 124. To be more specific, the PGC information table stored in the storage 124 indicates the relationship among the PGC, the VOB ID number and the cell ID number. The storage 125 retains the VOB information table indicating the physical addresses on the disk corresponding to the PGC, the VOB ID number and the cell ID number in the PGC information table. Therefore, in order to replay the menu of the embodiment, the CPU 109 reads the PGC information table in the storage 124 so as to obtain the VOB ID number and the cell ID number of the PGC. The CPU 109 thus obtains the physical addresses on the disk corresponding to the VOB ID number and the cell ID number in the VOB information table in the storage 125.

Figure 18:
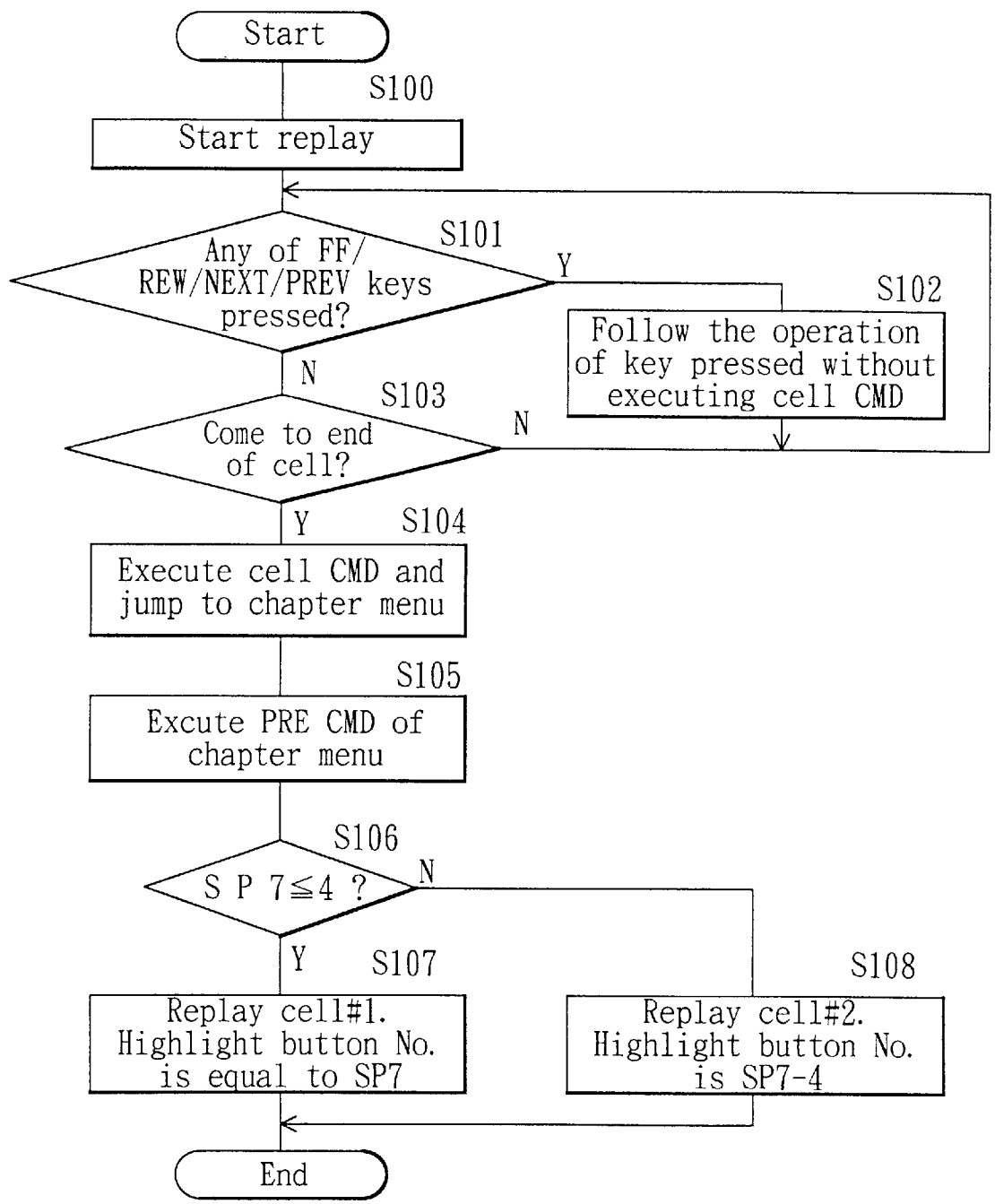
FIG. 18 is a flowchart of replay operation of the embodiment of the invention.

Referring to the flowchart shown in FIG. 18, the operation of replay of a content (tune) by the DVD player of the embodiment of the invention will now be described. The following operation mainly corresponds to the operation of the CPU 109 in the example shown in FIG. 18.

The operation is started by the viewer instructing the DVD player to replay a specific tune (chapter) with the remote controller. On receiving the instruction, the DVD player starts a replay of the tune (step S100). The CPU 109 of the DVD player determines whether the viewer presses any of the fast forward key (shown as FF), the fast reverse key (shown as REV), the next skip key (shown as NEXT), and the previous skip key (shown as PREV) of the remote controller (step S101). If any of the keys is pressed (Y), the CPU 109 follows the operation of the key pressed without executing the cell CMD (step S102). The CPU 109 returns to step S101 and continues the replay. If none of the keys is pressed (N in step S101), the CPU 109 replays the cell and determines whether the replay comes to the end of the cell (step S103). If the replay has not come to the end of the cell (N), the CPU 109 returns to step S101 and continues the replay. If the replay has come to the end of the cell (Y in step S103), the CPU 109 executes the cell CMD of the cell replayed and shifts to the chapter menu (step S104).

Next, the CPU 109 executes the PRE CMD of the PGC for the chapter menu (step S105) and determines whether the value of SP7 is four or below (step S106). If four or below (Y), the button number to highlight is made equal to the value of SP7 and the CPU 109 replays cell #1, that is, the menu picture 20a of the first page shown in FIG. 4 (step S107) and completes the replay of the tune. If the value of SP7 is not four or below (N in step S106), the button number to highlight is set to the value of SP7 from which 4 is subtracted and the CPU 109 replays cell #2, that is, the menu picture 20b of the second page shown in FIG. 4 (step S108) and completes the replay of the tune.

Figure 19:
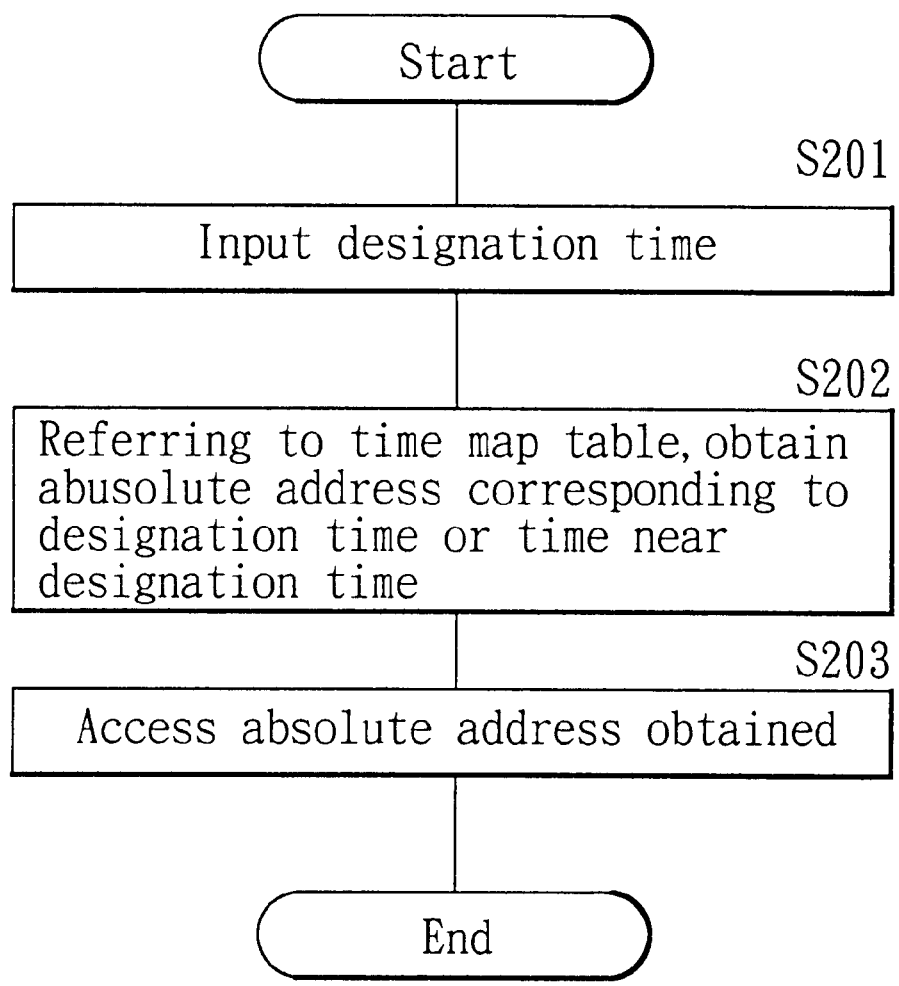
FIG. 19 is a flowchart of random access operation by replay start time designation of the embodiment of the invention.

Referring to a flowchart shown in FIG. 19, the operation of random access for jumping to a specific point in a specific tune by inputting time at which a replay is started will now be described. The operation is started when the time designation key 141 of the remote controller 92 is pressed and the time designation mode is selected. The viewer inputs desired replay start time as designation time by the remote controller 92 (step S201). To be specific, the viewer determines designation time with the ten keys 142 and enters the designation time with the enter key 143. Referring to the time map table, the CPU 109 obtains an absolute address corresponding to the entered designation time or an absolute address corresponding to time near the designation time (step S202). The time map table is provided for each VOB to show a relationship between the replay time of the main title and the absolute address on the disk of the data of the main title corresponding to the replay time at regular time intervals. The time map table may be stored in the entry search information as an option. The CPU 109 accesses the absolute address obtained and starts a replay at the absolute address corresponding to the designation time or the absolute address corresponding to time near the designation time (step S203) and completes the operation of random access by inputting the replay start time.

According to the data recording medium and the data replay apparatus of the embodiment described so far, the data structure is such that the entire DVD is made up of the one PGC and the contents (tunes) are divided into cells. Furthermore, an instruction to return to the chapter menu is written in each cell CMD. As a result, an automatic return to the chapter menu at the completion point of a replay of one content (tune) is allowed. In addition, fast forward, fast reverse and a skip across the tunes are allowed even during a replay of a content (tune).

Since the data structure is such that the entire DVD is made up of the one PGC and the contents (tunes) are divided into cells, elapsed time is added up in order of replay of the cells, the start of the PGC being defined as zero, according to the DVD format. As a result, the elapsed time throughout the disk may be displayed. Random access to a specific point in a specific content (tune) by inputting time at which a replay is started is thus achieved.

In the embodiment, at the completion of a normal replay of each content (tune), the operation returns to the chapter menu by the cell CMD executed at the end of the content. The menu picture including the menu buttons for selecting the content whose replay is completed is automatically selected and displayed at the completion of the normal replay of the content by using the immediately previous replayed PTT number recorded in the system parameter by the PRE CMD of the PGC of the chapter menu. In addition, the menu button indicating the content is highlighted. As a result, a grasp of the immediately previous replayed content and selection of the next content are easily achieved and the ease of operation by the viewer is improved.

The invention is not limited to the foregoing embodiment but may be practiced in still other ways. For example, the data recording medium of the invention is not limited to a DVD as described in the foregoing embodiment but may be any other type of recording medium. Similarly, the data replay apparatus of the invention is not limited to a DVD player but may be any other apparatus used for replaying information recorded on any other medium.

Alternatively, a plurality of titles each made up of one PGC (one sequential PGC title) may be recorded on a disk and a plurality of cells corresponding to a plurality of contents may be stored in each title. In this case, as in the foregoing embodiment, fast forward, fast reverse and a skip across the contents and random access by designating replay start time are allowed in each title. In addition, the menu picture for selecting the immediately previous replayed content is automatically selected and displayed at the completion of a normal replay of the content and the menu button indicating the content is highlighted in each title.

Although the disk on which a musical product is recorded is described in the embodiment, the invention may be applied to any other product such as an educational material wherein chapters are highly independent of one another.

According to the data recording medium and the data replay apparatus of the invention, the replay control data item has a data structure that allows a shift from a state of replay of a specific one of the contents to a state of replay of another one of the contents, and a data structure that includes an instruction data item executed only during a normal replay for instructing to display the menu by the menu control data item after the replay of the content data item is completed. As a result, an automatic return to the menu is allowed at the completion point of the replay of the specific content. A shift from the state of replay of the specific content to a state of replay of another content is achieved as well. The ease of operation by the viewer is thus further improved.

According to the data recording medium and the data replay apparatus of the invention, the one of the pages of the menu including the option corresponding to the immediately previous replayed content is selectively displayed, based on the menu control data item when the instruction is made to display the menu. As a result, a grasp of the immediately previous replayed content and selection of the next content are easily achieved and the ease of operation by the viewer is improved.

Obviously many modifications and variations of the present invention are possible in the light of the above teachings. It is therefore to be understood that within the scope of the appended claims the invention may be practiced otherwise than as specifically described.

What is claimed is:

1. A data recording medium retaining data for individually selecting a plurality of contents and replaying each of the contents, including:
   a plurality of content data items sectioned so as to each correspond to the respective contents and representing the respective contents;
   a replay control data item for controlling replay of said content data items; and
   a menu control data item for displaying a menu for individually selecting the contents and instructing to replay by said replay control data item; wherein:
   said replay control data item has a data structure that allows a shift from a state of replay of a specific one of the contents to a state of replay of another one of the contents, and a data structure that includes an instruction data item executed only during a normal replay for instructing to display the menu by said menu control data item after the replay of said content data item is completed.

2. A data recording medium according to claim 1 wherein said menu control data item has a data structure for displaying a menu having a plurality of pages including at least one option corresponding to at least one of the contents, and a data structure for selectively displaying one of the pages of said menu including the option corresponding to the immediately previous replayed content when said instruction data item instructs to display said menu.

3. A data replay apparatus used for a data recording medium including:
   a plurality of content data items sectioned so as to each correspond to the respective contents and representing the respective contents; a replay control data item for controlling replay of said content data items; and a menu control data item for displaying a menu for individually selecting the contents and instructing to replay by said replay control data item; wherein said replay control data item has a data structure that allows a shift from a state of replay of a specific one of the contents to a state of replay of another one of the contents, and a data structure that includes an instruction data item executed only during a normal replay for instructing to display the menu by said menu control data item after the replay of said content data item is completed, said apparatus replaying said content data items, comprising:
   a menu display means for displaying said menu by using said menu control data item;
   a replay instruction means for instructing to replay by individually selecting a specific one of the contents by using said menu displayed by said menu display means and for instructing to change the state of replay including a shift from the state of replay of the specific one of the contents to a state of replay of another one of the contents;
   a content replay means for replaying said content data item by using said menu control data item and said replay control data item, following the instruction given by said replay instruction means; and
   a menu display instruction means for having said menu display means display said menu based on said instruction data item of said replay control data item after the replay of said content data item by said content replay means is completed.

4. A data replay apparatus according to claim 3 wherein said menu control data item has a data structure for displaying a menu having a plurality of pages including at least one option corresponding to at least one of the contents, and a data structure for selectively displaying one of the pages of said menu including the option corresponding to the immediately previous replayed content when said instruction data item instructs to display said menu; and
   said menu display means selectively displays the one of the pages of said menu including the option corresponding to the immediately previous replayed content, based on said menu control data item when said instruction data item instructs to display said menu.

* * * * *